United States Patent
Williams

(10) Patent No.: US 9,676,364 B2
(45) Date of Patent: Jun. 13, 2017

(54) AIRBAG SYSTEMS WITH PASSIVE VENTING CONTROL

(71) Applicant: AUTOLIV ASP, INC., Ogden, UT (US)

(72) Inventor: Jeffrey Daniel Williams, Roy, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/871,248

(22) Filed: Sep. 30, 2015

(65) Prior Publication Data

US 2017/0088087 A1    Mar. 30, 2017

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01); *B60R 2021/2395* (2013.01); *B60R 2021/23384* (2013.01)

(58) Field of Classification Search
CPC .......... B60R 21/239; B60R 2021/2395; B60R 2021/23384; B60R 21/2338
See application file for complete search history.

(56) References Cited

U.S. PATENT DOCUMENTS

| | | | | |
|---|---|---|---|---|
| 6,832,778 B2 * | 12/2004 | Pinsenschaum | ...... | B60R 21/233 280/739 |
| 7,192,053 B2 * | 3/2007 | Thomas | ................ | B60R 21/233 280/739 |
| 7,195,281 B2 * | 3/2007 | Williams | .............. | B60R 21/233 280/730.1 |
| 7,607,690 B2 * | 10/2009 | Abe | ...................... | B60R 21/231 280/739 |
| 7,784,828 B2 * | 8/2010 | Matsu | ................... | B60R 21/233 280/739 |
| 7,819,425 B2 * | 10/2010 | Webber | ................. | B60R 21/233 280/743.2 |
| 7,857,347 B2 * | 12/2010 | Abe | .................... | B60R 21/2338 280/729 |

(Continued)

FOREIGN PATENT DOCUMENTS

| WO | WO2009019924 | 2/2009 |
|---|---|---|
| WO | WO2014123686 | 8/2014 |

*Primary Examiner* — Paul N Dickson
*Assistant Examiner* — Timothy Wilhelm
(74) *Attorney, Agent, or Firm* — Stoel Rives LLP

(57) ABSTRACT

Airbag assemblies and vents are disclosed. An airbag assembly includes an airbag cushion and a vent assembly including a vent, one or more sheer tethers, and a peel tether. The sheer tether(s) are configured to be drawn to a taut state by expansion of the airbag cushion to configure the vent in a first venting state. The sheer tether(s) are releasably coupled to the peel tether. The releasable coupling is configured to maintain the sheer tether(s) releasably coupled to the peel tether. The peel tether is configured to transition from a slack state to a taut state as the airbag cushion continues to expand. The peel tether drawn taut produces a peel force transverse to the sheer force. The peel force causes the releasable coupling to release and the peel tether to uncouple from the sheer tether(s), to transition the vent to a second state.

21 Claims, 19 Drawing Sheets

(56) References Cited

U.S. PATENT DOCUMENTS

| | | | |
|---|---|---|---|
| 7,878,538 B2* | 2/2011 | Abe | B60R 21/2338 280/736 |
| 7,922,199 B2* | 4/2011 | Webber | B60R 21/233 280/743.2 |
| 8,020,890 B2* | 9/2011 | Webber | B60R 21/2338 280/739 |
| 8,020,891 B2* | 9/2011 | Fukawatase | B60R 21/2338 280/739 |
| 8,191,925 B2* | 6/2012 | Williams | B60R 21/2338 280/739 |
| 8,226,118 B2* | 7/2012 | Rose | B60R 21/2338 280/743.2 |
| 8,434,786 B2* | 5/2013 | Jang | B60R 21/2338 280/739 |
| 8,646,808 B2* | 2/2014 | Williams | B60R 21/239 280/739 |
| 8,651,521 B2* | 2/2014 | Kuhne | B60R 21/2338 280/739 |
| 8,684,407 B2* | 4/2014 | Fischer | B60R 21/2338 280/739 |
| 8,746,736 B2* | 6/2014 | Mendez | B60R 21/239 280/736 |
| 8,840,140 B2* | 9/2014 | Mendez | B60R 21/2338 280/743.2 |
| 8,870,223 B2* | 10/2014 | Choi | B60R 21/2338 280/739 |
| 8,882,143 B2* | 11/2014 | Williams | B60R 21/239 280/739 |
| 9,108,590 B2* | 8/2015 | Williams | B60R 21/239 |
| 9,150,189 B1* | 10/2015 | Nelson | B60R 21/2338 |
| 9,187,058 B2* | 11/2015 | Yamaji | B60R 21/205 |
| 9,216,712 B1* | 12/2015 | Kwon | B60R 21/2338 |
| 9,327,674 B2* | 5/2016 | Fischer | B60R 21/239 |
| 9,393,927 B2* | 7/2016 | Kim | B60R 21/239 |
| 2002/0175511 A1 | 11/2002 | Dunkle et al. | |
| 2005/0127653 A1 | 6/2005 | Williams et al. | |
| 2007/0132222 A1* | 6/2007 | Thomas | B60R 21/231 280/743.2 |
| 2007/0145729 A1* | 6/2007 | Ishiguro | B60R 21/239 280/739 |
| 2010/0001498 A1* | 1/2010 | Abe | B60R 21/2338 280/739 |
| 2011/0031725 A1 | 2/2011 | Rose et al. | |
| 2014/0175778 A1 | 6/2014 | Choi et al. | |
| 2015/0375711 A1* | 12/2015 | Umehara | B60R 21/239 280/740 |

\* cited by examiner

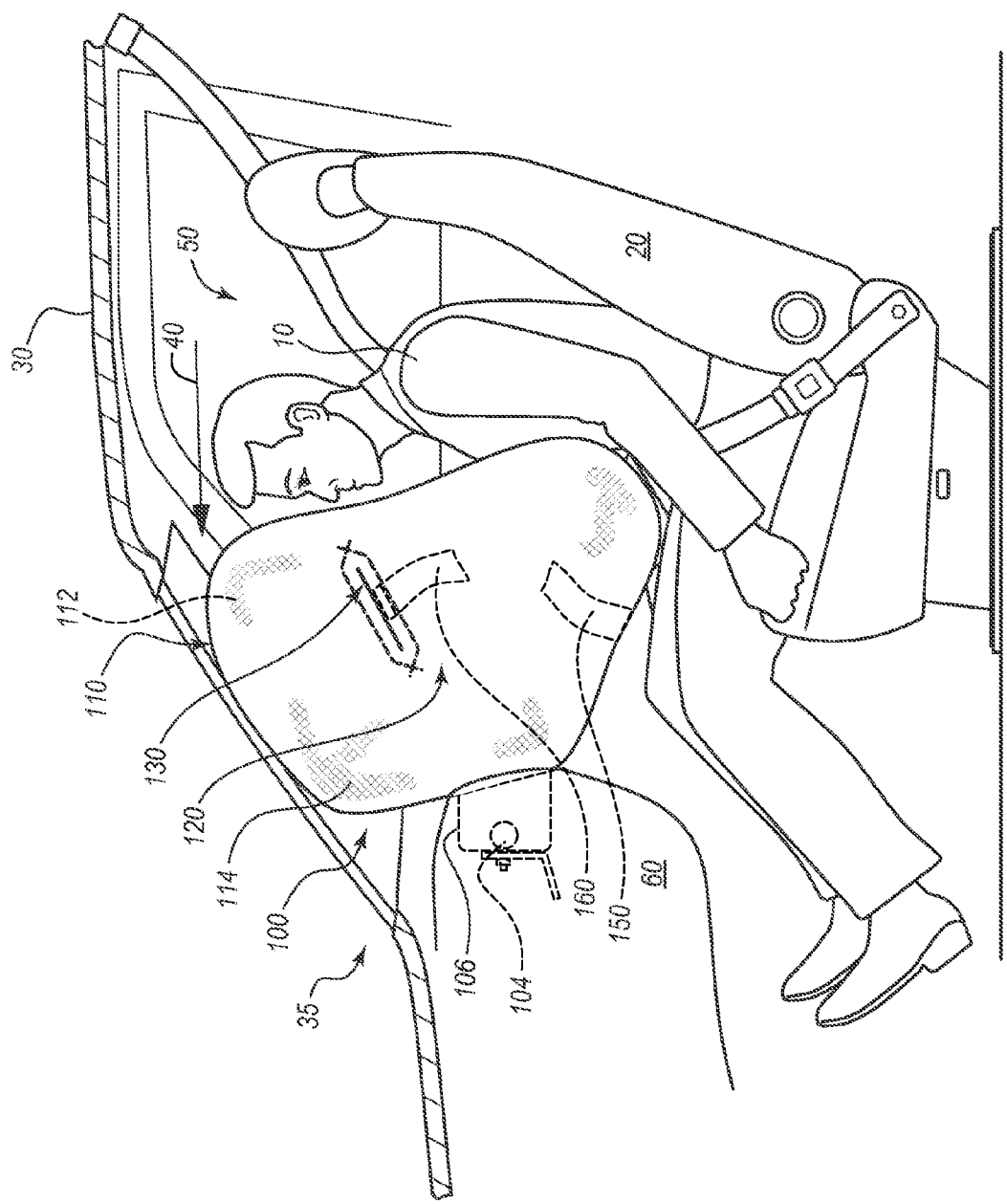

ns with Passive
Venting Control

TECHNICAL FIELD

The present disclosure relates generally to the field of automotive protective systems. More specifically, the present disclosure relates to inflatable airbag cushion assemblies.

BACKGROUND

Airbags may be mounted within a vehicle and deployed so as to prevent a vehicle occupant from impact with a vehicular structure during a collision event. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1C is a side view of the occupant and airbag assembly of FIG. 1A at a second time during a collision event.

DETAILED DESCRIPTION

Figure 1A:
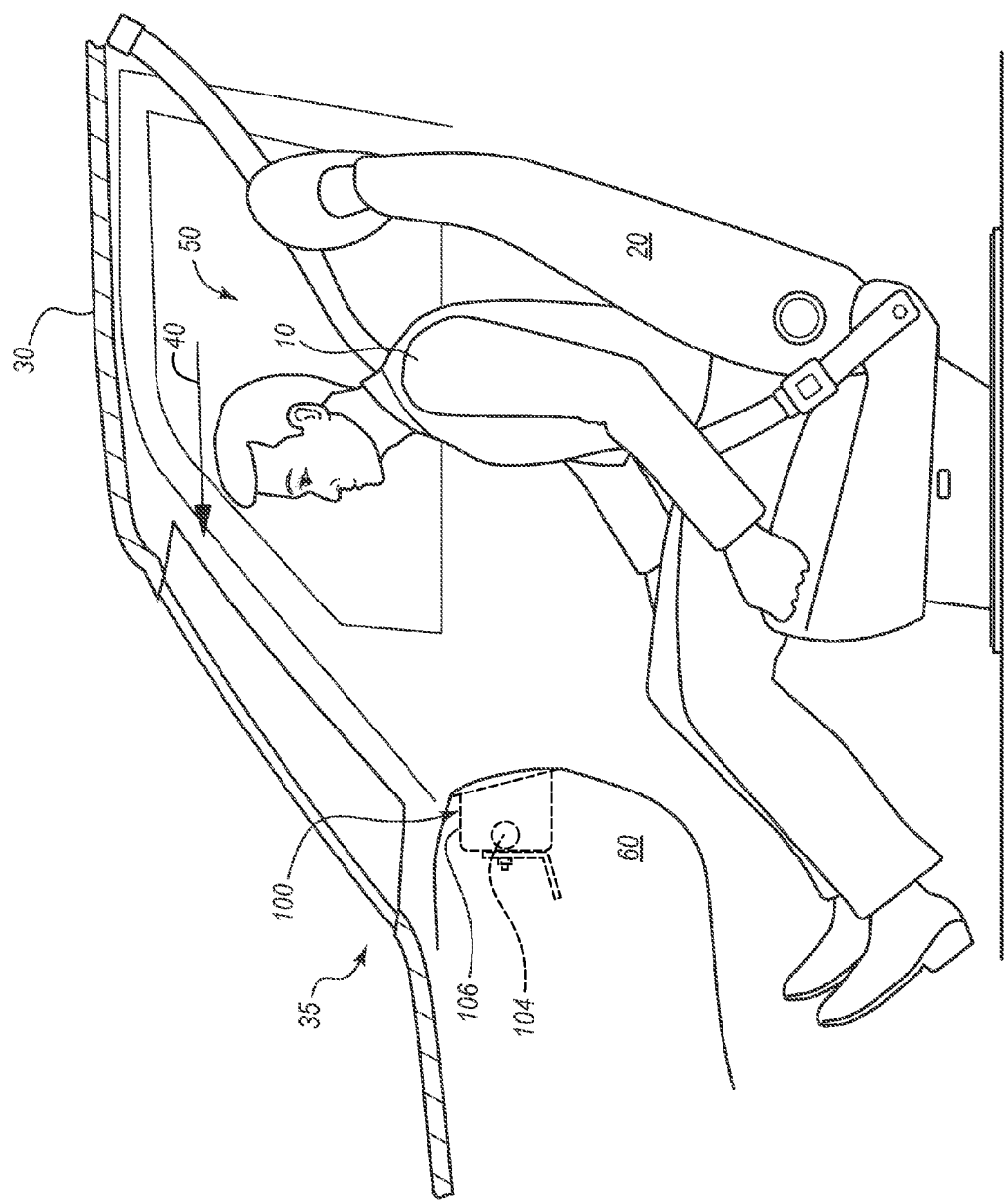
FIG. 1A is a side view of an airbag assembly disposed in a vehicle instrument panel prior to deployment of the airbag assembly, according to one embodiment of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.). The phrases "fluid communication" and "fluidly coupled" are used in their ordinary sense, and are broad enough to refer to arrangements in which a fluid (e.g., a gas and/or a liquid) can flow from one element to another element when the elements are in fluid communication with each other.

The "venting capacity" of an airbag cushion or an airbag assembly may refer to the degree to which the airbag assembly allows inflation gas to vent from or exit the airbag assembly. For example, when one or more vents of an airbag cushion or airbag assembly are configured to allow a substantial volume of inflation gas to exit or vent from the airbag assembly in a largely unobstructed fashion, the airbag assembly may include a relatively large venting capacity. Conversely, one or more vents of the airbag assembly may more fully obstruct inflation gas from exiting the airbag assembly and the airbag assembly may then have a relatively low venting capacity. Stated differently, one or more vents or apertures of an airbag assembly may be obstructed to a lesser degree when the airbag assembly has a relatively high venting capacity, while one or more vents or apertures may be obstructed to a greater degree when the airbag assembly has a relatively low venting capacity. The venting capacity of an airbag or airbag assembly may correspond with an air pressure (e.g., a pressure of inflation gas) within an interior of an airbag or airbag assembly (e.g., within an inflatable chamber defined by the airbag).

A venting capacity (e.g., an optimal venting capacity) of an airbag assembly may correspond to an air pressure (e.g., an optimal air pressure) within an airbag cushion of the airbag assembly during a collision event. For example, it may be advantageous for an airbag cushion to have a relatively low venting capacity in response to some collision conditions and a relatively high venting capacity in response to other collision conditions. More specifically, airbags that only partially inflate, or are configured with a relatively high venting capacity, during initial stages of a collision event may provide better protection for and/or reduce the incidence of injury to an occupant in an out-of-position ("OOP") condition (an OOP occupant) or other situation in which a low-risk deployment ("LRD") may be desirable. Examples of OOP conditions and other LRD situations include collision events where a child, a baby in a rear-facing car seat, or an adult positioned too close to the airbag cushion interacts with the airbag cushion during inflation and expansion of deployment of the airbag assembly. Other collision conditions may also make LRD desirable.

Although specific reference is made to front airbag assemblies (e.g., front passenger airbag assemblies), the disclosed principles and features may be applied to and used with a variety of airbag deployment systems, including knee airbags, overhead airbags, curtain airbags, and the like. Although an embodiment of a front passenger airbag assembly is shown in the drawings, it should be recognized that the disclosure is not limited to this specific context, and the principles and features described herein may apply to airbag cushions of various shapes, sizes, and configurations.

Figure 1B:
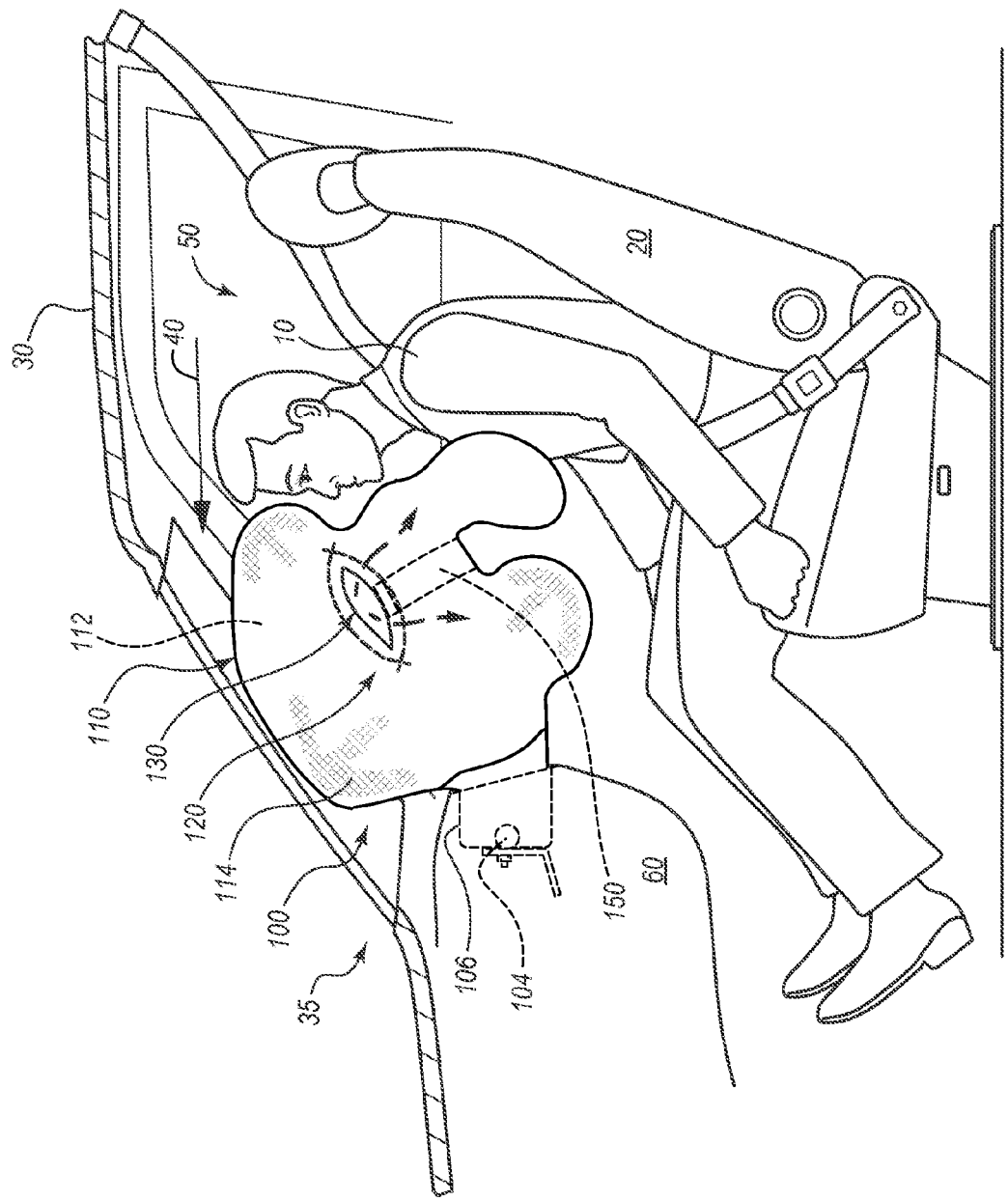
FIG. 1B is a side view of the airbag assembly of FIG. 1A at a first time during a collision event.
Figure 1D:
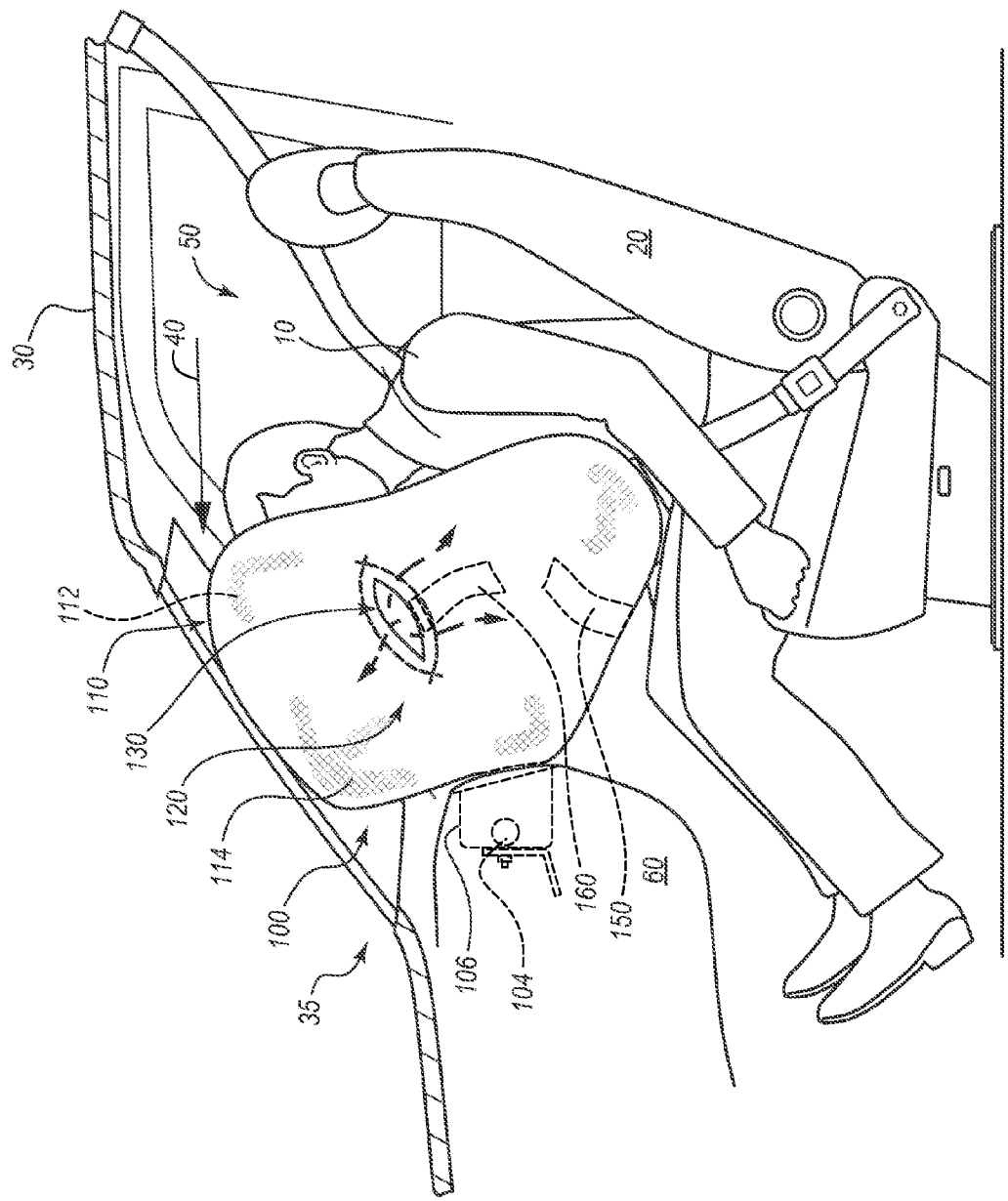
FIG. 1D is a side view of the occupant and airbag assembly of FIG. 1A at a third time during a collision event.

FIGS. 1A-1D are side views of an interior of a vehicle 30, in which an occupant 10 is seated on/in a seat 20. The vehicle 30 includes an inflatable airbag assembly 100, according to one embodiment, mounted in an instrument panel 60 of the vehicle 30. FIG. 1A is a side view of the interior of the vehicle 30 with the inflatable airbag assembly 100 in an uninflated or compact configuration prior to deployment of the airbag assembly 100. FIG. 1B is the inflatable airbag assembly 100 with an airbag cushion 110 partially inflated and in a first state or a venting state. FIG. 1C is the inflatable airbag assembly 100 in a second state or a closed state. FIG. 1D is the inflatable airbag assembly 100 in a third state or another venting state.

Referring to FIGS. 1A-1D generally and collectively, the inflatable airbag assembly 100 may include an airbag cushion 110 and a venting assembly 120. The airbag cushion 110 may be retained in a packaged (e.g., rolled, folded, or otherwise compressed) state within an airbag housing 106 disposed in an instrument panel 60 of the vehicle 30, in front of and opposite a vehicle seating position 50. The vehicle seating position 50 may be defined by the seat (e.g., front passenger seat) 20 and may be a position in which the occupant 10 may be seated prior to and/or during a collision event or a position in which the vehicle 30 and/or the seat 20 is designed to transport an occupant 10. The airbag cushion 110 may include a plurality of panels configured to define an inflatable chamber 112. During a collision event, an inflator 104 may be triggered, which rapidly fills the inflatable chamber 112 with inflation gas, causing the airbag assembly 100 to deploy. During deployment of the airbag assembly 100, the airbag cushion 110 may expand in a rearward direction or toward the vehicle seating position 50.

The venting assembly 120 may include a first vent 130, a peel tether 150 and a sheer tether 160. The first vent 120 may be a slit or aperture through a first panel 114 (e.g., a first side panel) of the airbag cushion 110, and may be configurable in different states (e.g., a high venting state, a low venting state, a closed state). During initial expansion of the airbag cushion 110, the first vent 130 may be configured in a first venting state, shown in FIG. 1B, to allow gas to exit or vent from the airbag assembly 100. Venting gas from the airbag assembly 100 may reduce a pressure within the inflatable chamber 112 and cause the airbag cushion 110 to provide less initial resistance to an occupant's movement in a forward direction 40 (e.g., toward the instrument panel 60). The relatively low pressure of inflation gas within the inflatable chamber 112, as a result of the increased venting capacity, may allow the airbag cushion 110 to expand and exert a relatively low initial force on an occupant 10 who may be disposed in an OOP condition. In other words, the first venting state of the vent 130 enables LRD of the airbag 110.

Following initial deployment or expansion of the airbag cushion 110, the peel tether 150 and the sheer tether 160 may release and the first vent 130 may be configured in a second state to decrease or limit the venting capacity of the airbag assembly 100. The first vent 130 may substantially restrict the flow of gas out of the airbag assembly 100 until a sufficient pressure is achieved within the inflatable chamber 112 (e.g., as the occupant 10 impacts and exerts more force on the airbag cushion 110). When a sufficient pressurization of inflation gas exists within the inflatable chamber 112, such as shown in FIG. 1D, the first vent 130 may allow a limited flow of inflation gas from the airbag assembly 100 (e.g., decrease the venting capacity) during occupant ride down. The airbag cushion 110 configured with a decreased venting capacity may provide relatively high resistance to the occupant 10 impacting the airbag assembly 100, as shown in FIG. 1D. In other words, due to the relatively high pressure within the inflatable chamber 112, the airbag cushion 110 may exert a relatively high initial force on the occupant 10 to provide adequate resistance during occupant ride down.

During a collision event with the occupant 10 in an OOP situation, the airbag assembly 100 or airbag cushion 110 may deploy and expand to impact the occupant 10 while the vent is still in the first venting state and providing increased venting capacity, and thus reduced pressure within the airbag cushion 110, as shown in FIG. 1B. The increased venting capacity of the airbag assembly 100 may avoid and/or reduce excessive impact to or injury of the occupant 10 if in an OOP condition. The airbag assembly 100, and more specifically the vent 130, can remain in the first venting state to provide increased venting capacity so long as the occupant 10 remains in an OOP situation.

Figure 2A:
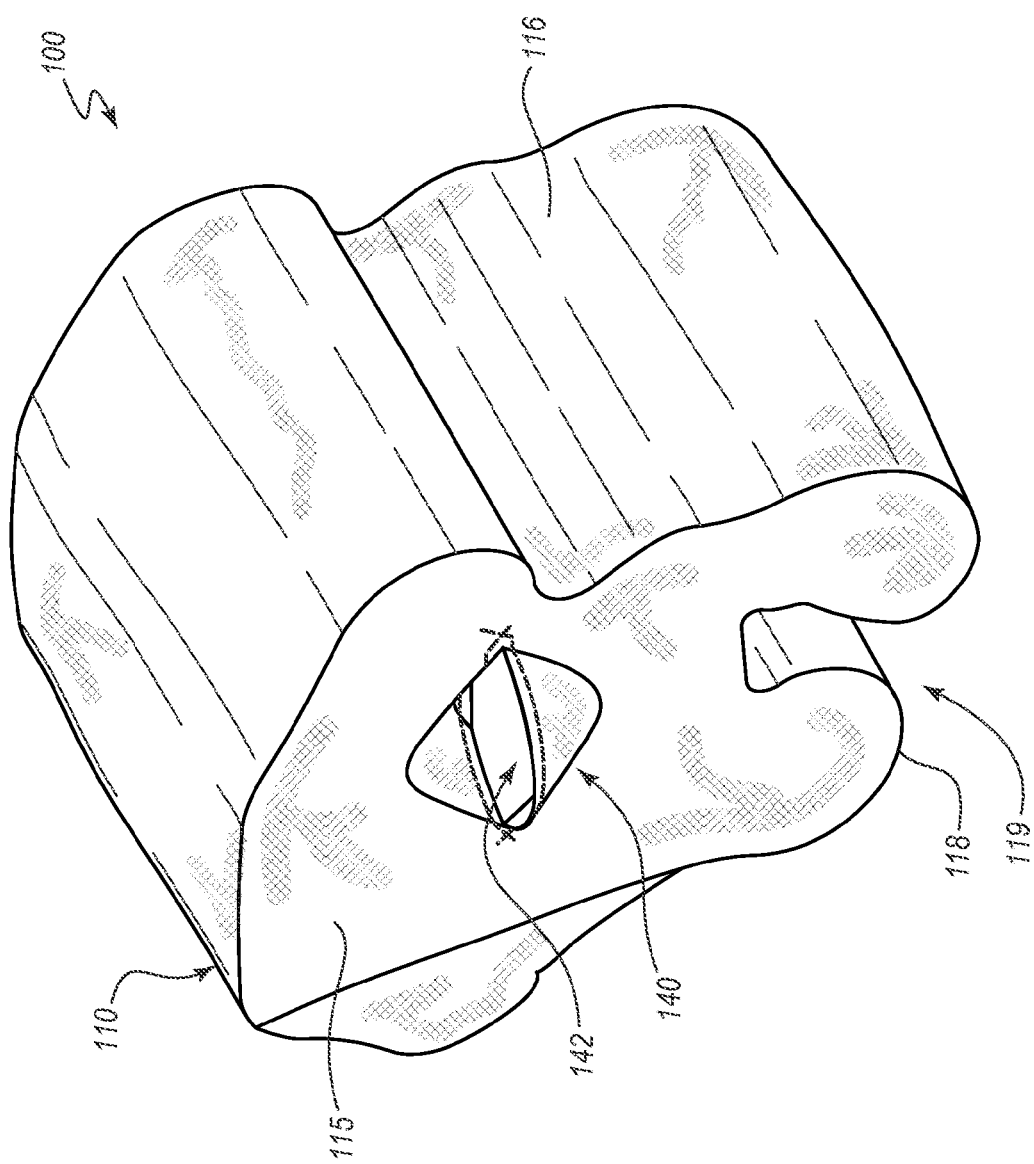
FIG. 2A is a perspective view of the airbag assembly of FIG. 1A at a substantially similar stage of deployment as FIG. 1B.
Figure 2B:
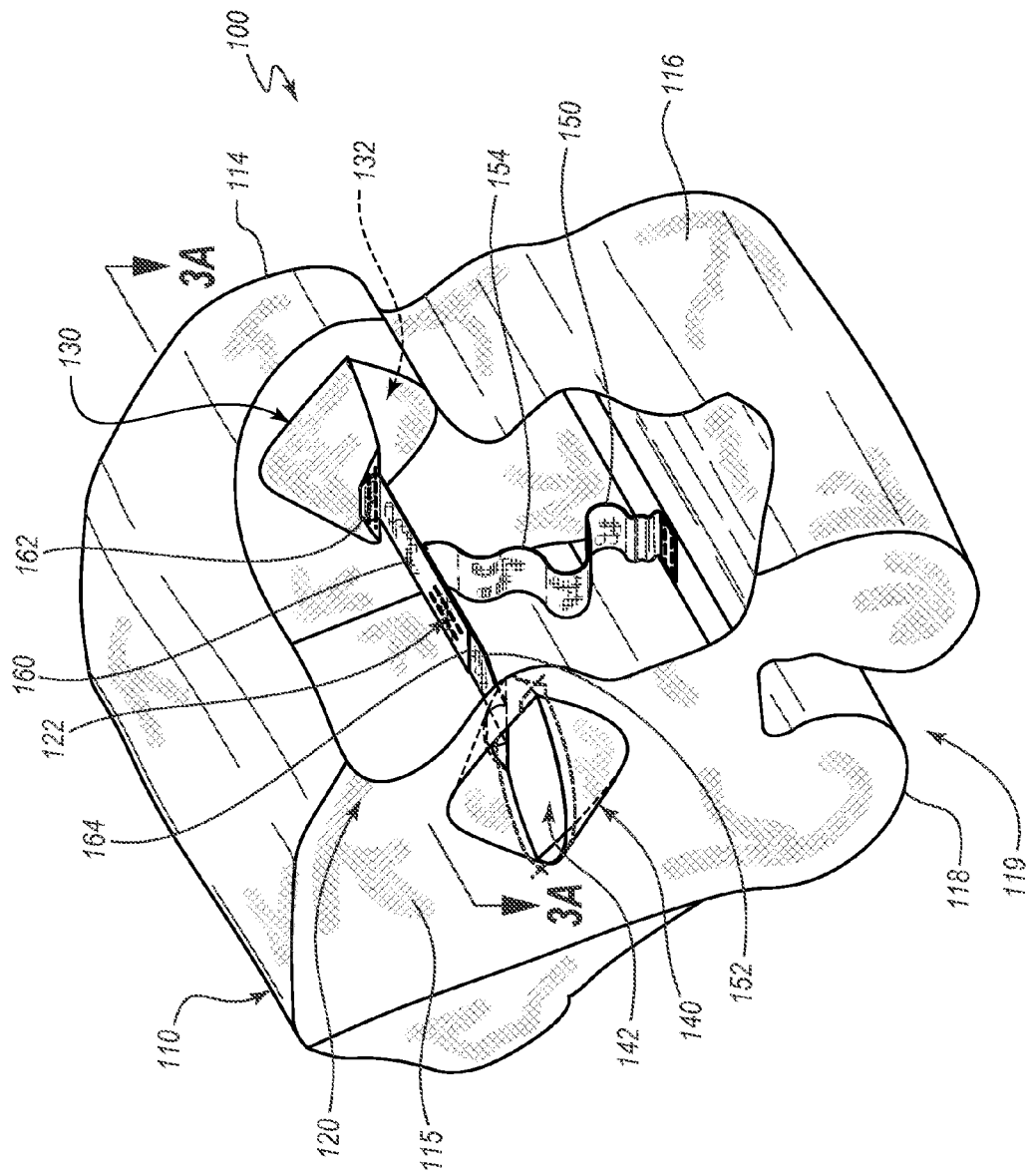
FIG. 2B is a cut-away perspective view showing the interior of the airbag assembly of FIG. 1A.
Figure 2C:
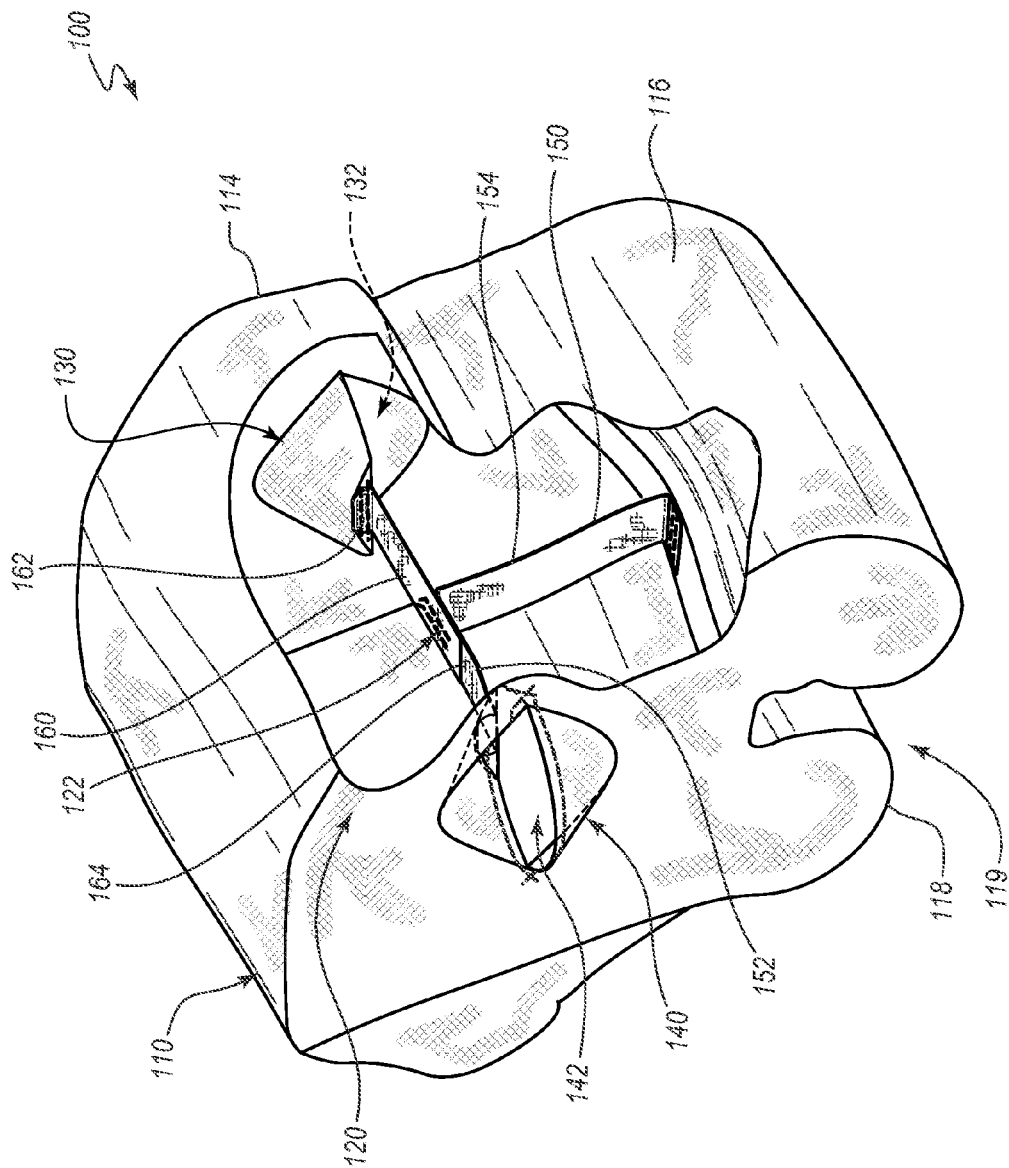
FIG. 2C is a cut-away perspective view of the airbag assembly of FIG. 1A at another stage of deployment of the airbag assembly.
Figure 2D:
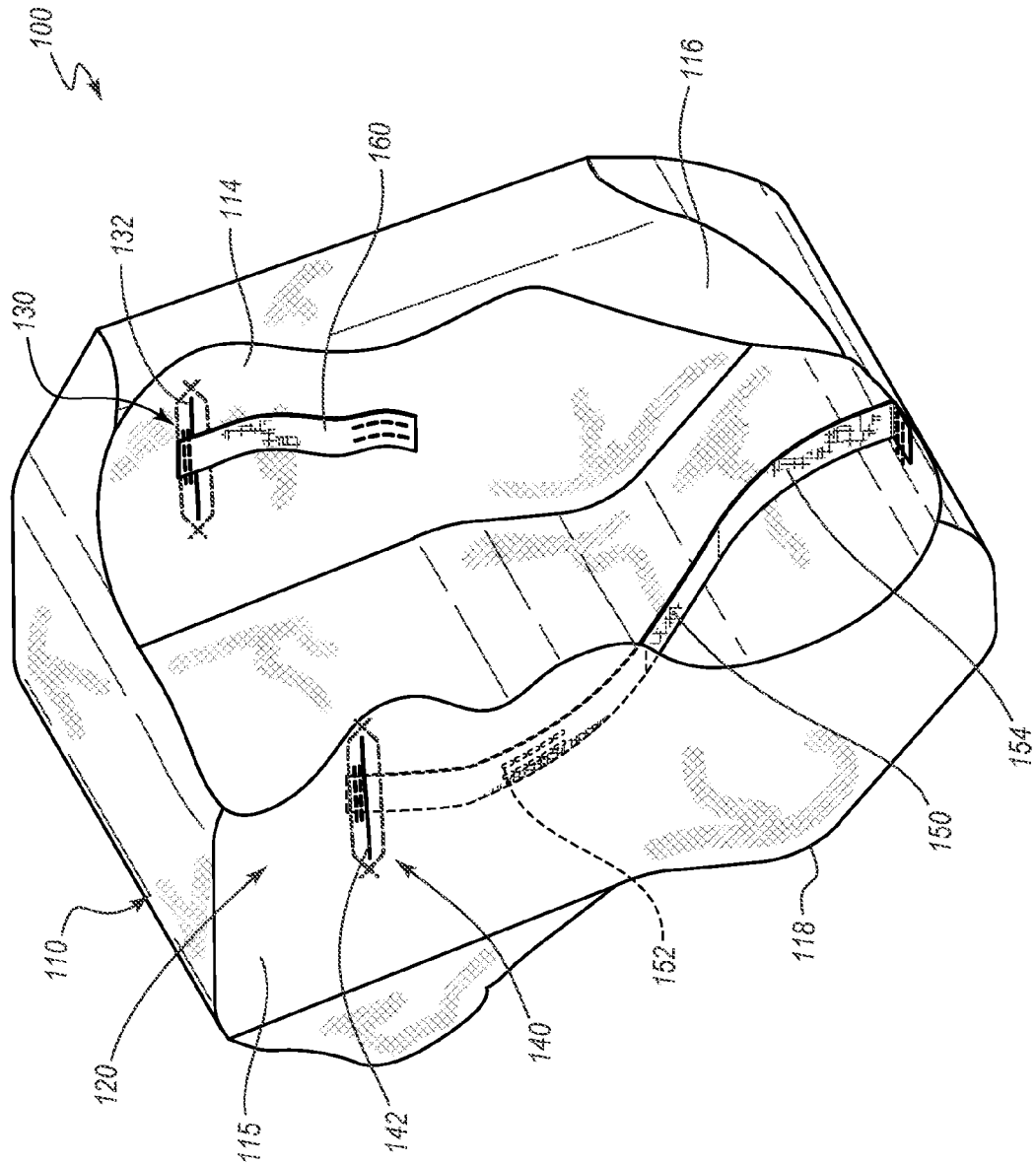
FIG. 2D is a cut-away perspective view of the airbag assembly of FIG. 1A at another stage of deployment of the airbag assembly.
Figure 2E:
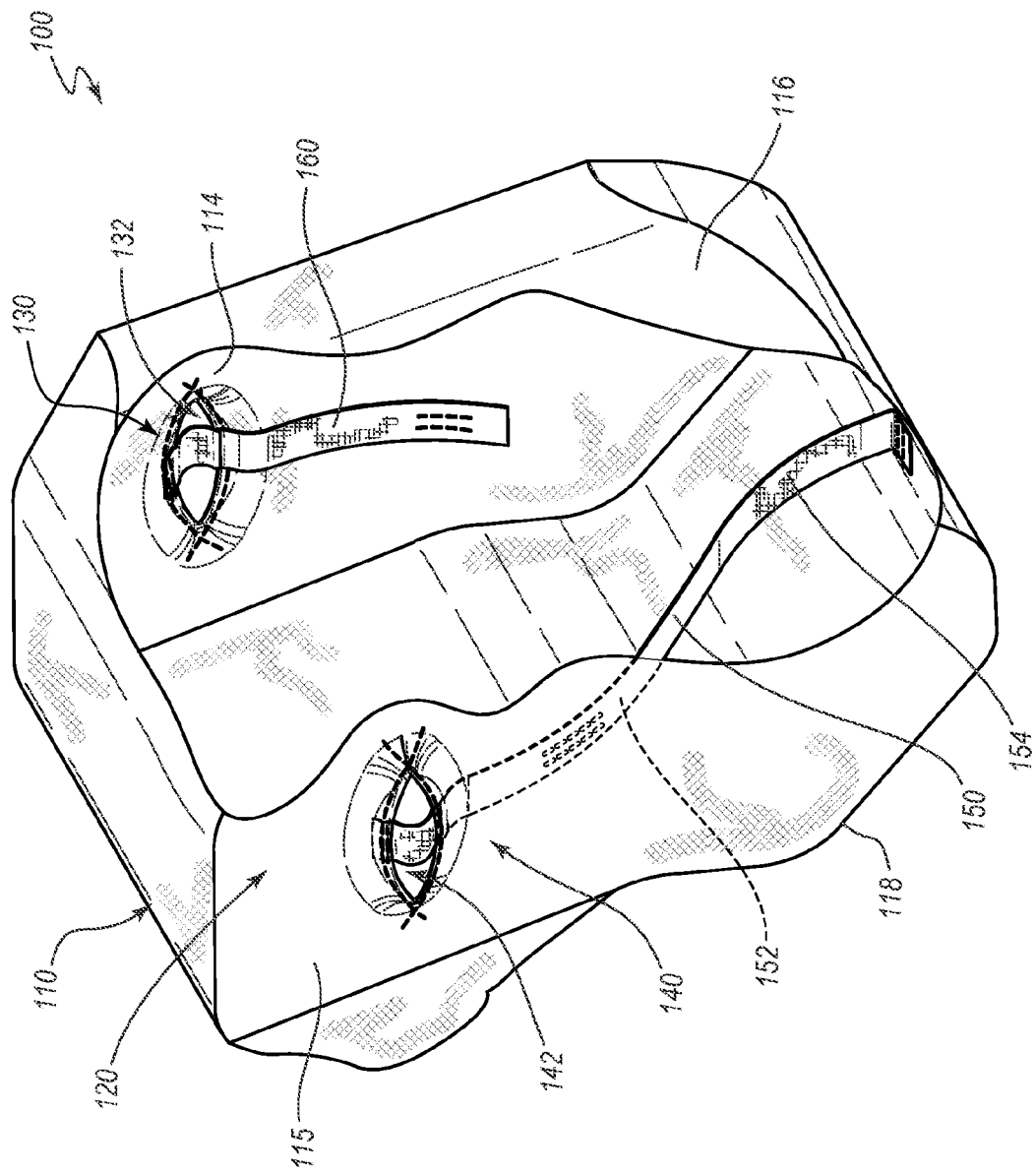
FIG. 2E is a cut-away perspective view of the airbag assembly of FIG. 1A at another stage of deployment of the airbag assembly.

FIGS. 2A-2E are perspective views of the inflatable airbag system of FIG. 1A at various stages of deployment. FIG. 2A is a perspective view of the airbag assembly 100 of FIG. 1A at a substantially similar stage of deployment as FIG. 1B. FIG. 2B is a perspective partial cut-away view of the airbag assembly 100, showing the interior of the airbag cushion 110 and tethers 150, 160 of the venting assembly 120 at a substantially similar stage of deployment as FIGS. 1B and 2A. The venting assembly 120 is in a sheer configuration. FIG. 2C is a cut-away perspective view of the airbag assembly 100 at another stage of deployment, with a peel tether 150 taut. The venting assembly 120 is in a peel configuration. FIG. 2D is a cut-away perspective view of the airbag assembly 100 with the peel tether 150 and the sheer tether 160 released. FIG. 2E is a cut-away perspective view of the airbag assembly 100 in a limited venting state.

FIG. 2A is a perspective view of the airbag cushion 110 of the airbag assembly 100 shortly after initiation of deployment. The airbag cushion 110 is partially inflated and expanded. The airbag assembly 100 comprises a plurality of panels 114, 115, 116, 118, defining an inflatable chamber 112. The panel 114 may be a first side panel, and in some embodiments, may be a left-side panel, as shown in FIG. 2B.

The panel 115 may be a second side panel and may be a right-side panel, as shown in FIG. 2B. In other embodiments, the panel 118 may be a first side panel and may be a top panel. Further, the panel 116 may be a second side panel and may be a bottom panel. In certain embodiments, the panels 114, 115, 116, 118 may be separate panels that have been coupled together, while in other embodiments, the panels 114, 115, 116, 118 may be portions or regions of a single panel defining the airbag 110.

Vents are disposed in and through opposing panels 114, 115 of the airbag cushion 110 and may comprise a first vent 130 (see FIG. 2B) and a second vent 140 of the venting assembly 120. The vents 130, 140 vent inflation gas from the airbag assembly 100 and while the venting assembly 120 is in a sheer configuration, to facilitate LRD of the airbag cushion 110 (e.g., as may be desirable in the case of an occupant in an OOP condition).

FIG. 2B is a perspective cut-away view of the airbag assembly 100, showing the interior of the airbag cushion 110, tethers 150, 160, and vents 130, 140 of the venting assembly 120 at a substantially similar stage of deployment as FIGS. 1B and 2A. The vents 130, 140 comprise first and second apertures 132, 142 respectively, to vent inflation gas and to facilitate LRD of the airbag cushion 110 in the case of an OOP occupant. As can be seen in FIG. 2B, the venting assembly 120 includes a sheer tether 160, a peel tether 150, and a releasable coupling 122 that releasably couples the sheer tether 160 to the peel tether 150. More specifically, the releasable coupling 122 may couple a second end 164 of the sheer tether 160 to a first portion 152 of the peel tether 150. The second end 164 of the sheer tether 160 may be opposite a first end 162 of the sheer tether 160. The first end 162 is coupled to the first vent 130. The first portion 152 of the peel tether 150 may be coupled to the second vent 140. A second portion 154 of the peel tether 150 may be coupled to a panel 118 that is oriented transverse (e.g., orthogonal or perpendicular) to the panels 114, 115 of the vents 130, 140.

In FIG. 2B, the venting assembly 120 is in a sheer configuration, with the airbag cushion 110 drawing the sheer tether 160 and the first portion 152 of the peel tether 150 to a taut state. In the sheer configuration, the sheer tether 160 is taut and the releasable coupling 122 resists sheer forces to maintain the sheer tether 160 and the peel tether 150 coupled. The vents 130, 140 may be drawn inward and away from the panels 114, 115 by the tethers 150, 160 as they are drawn into the taut state of the venting assembly 120 in a sheer configuration. Further, the venting assembly 120 in the sheer configuration may cause the first and second vents 130, 140 and/or the airbag assembly 100 to be in a first (e.g., a high or increased) venting state, with a first or large area corresponding to each of the vent apertures 132, 142. Accordingly, the venting assembly 120 in the sheer configuration may increase the venting capacity of the airbag assembly 100. Stated differently, the sheer tether 160 may be drawn taut to configure the first vent 130 in a first venting state, which may increase an area of the first aperture 132 to increase a venting capacity of the first vent 130.

With the venting assembly 120 in the sheer configuration the releasable coupling 122 may maintain (or may be configured to maintain) the sheer tether 160 releasably coupled to the peel tether 150. The releasable coupling 122 may maintain releasable coupling of the tethers 150, 160 in response to or in the presence of a sheer force that is produced by the expansion of the airbag cushion 110, the sheer force being oriented/directed in a direction that is perpendicular to the panels 114, 115.

FIG. 2C is a perspective cut-away view of the airbag assembly 100 at another stage of deployment, with the second portion 154 of the peel tether 150 in a taut state. The venting assembly 120 is in a peel configuration. The peel configuration of the venting assembly 120 may include the first portion 152 of the peel tether 150 and the sheer tether 160 in a taut state similar to the sheer configuration, with the sheer force still present. The peel configuration of the venting assembly 120 may include the airbag cushion 110 drawing the second portion 154 of the peel tether 150 to a taut state from a slack state as the airbag cushion 110 continues to expand. The venting assembly 120 in the peel configuration may cause the airbag cushion 110 to produce a peel force on the venting assembly 120. Specifically, in the peel configuration, the airbag cushion 110 produces a peel force on the releasable coupling 122 and the second portion 154 of the peel tether 150 that is oriented or directed perpendicular or otherwise transverse to the sheer forces on the sheer tether 160 and the first portion 152 of the peel tether 150. The releasable coupling 122 may be configured to begin to release the sheer tether 160 from the peel tether 150 in response to, or in the presence of, the peel force. Stated differently, a peel force in a direction perpendicular or otherwise transverse to the sheer force may cause the releasable coupling 122 to uncouple the sheer tether 160 from the peel tether 150. Specifically, the peel force on the second portion 154 of the peel tether 150 can cause the peel tether 150 to peel away from the sheer tether 160 to uncouple or release the releasable coupling 122.

The releasable coupling 122 may be formed via stitching, one or more adhesives, taping, welding (e.g., radio frequency welding), heat sealing, one-piece weaving, or any other suitable technique or combination of techniques for releasably coupling the sheer tether 160 to the peel tether 150. The releasable coupling 122 may be configured to release after the expanding airbag cushion 110 produces a peel force on the peel tether 150 (and specifically the second portion 154 of the peel tether 150) exceeding a predetermined release threshold of the releasable coupling 122. Further, the releasable coupling may be configured to release if the sheer force exceeds some failsafe threshold. In some embodiments, one or more characteristics of the releasable coupling 122 (e.g., stitch length, number and arrangement of stitches, surface area of the coupling, type and amount of adhesive) may at least partially determine the release threshold and/or failsafe threshold of the releasable coupling 122, which the peel and sheer forces, respectively, may be required to exceed in order to cause the coupling 122 to release.

FIG. 2D is the airbag assembly 100 with the peel tether 150 and the sheer tether 160 released. After the releasable coupling 122 releases to uncouple the sheer tether 160 from the peel tether 150, the vents 130, 140 may transition from the first venting state, shown in FIGS. 2A-2C, to a second state. More specifically, the first portion 152 of the peel tether 150 and the sheer tether 160 no longer draw a side of the vents 130, 140 away from the panels 114, 115, which allows the vent apertures 132, 142 to close. Thus, the second venting state of the vents 130, 140 may be a substantially closed state, which may significantly restrict the flow of inflation gas from the airbag assembly 100 via the apertures 132, 142 corresponding to the vents 130, 140. Restricting the flow of inflation gas from the airbag assembly 100 via the vents 130, 140 may cause the pressurization of inflation gas within the airbag cushion 110 to increase, which may allow the airbag cushion 110 to restrain and protect a vehicle occupant during a collision event.

FIG. 2E is the airbag assembly 100 in a limited venting state (e.g., a third state), which may cause a venting capacity of the airbag assembly 100 that is less than the venting capacity of the first venting state, but greater than the venting capacity of the second state. More specifically, the vents 130, 140 may be further configured to transition from the second (e.g., closed) state to the limited venting state based on the pressurization of gas within the inflatable chamber 112. The pressurization of inflation gas within the airbag cushion 110 (or inflatable chamber 112) may increase after the peel tether 150 releases the sheer tether 160, and the vents 130, 140 have transitioned into the second state. The inflatable chamber 112 may receive additional inflation gas and/or a vehicle occupant may impact the airbag cushion 110 to increase the pressurization within the airbag cushion 110, which increased pressurization may exceed a threshold of the vents 130, 140 and may cause the vents 130, 140 to transition from the second state to the limited venting state shown in FIG. 2E. The vents 130, 140 in the limited venting state may allow inflation gas to flow from the airbag assembly 100, to reduce the pressurization of inflation gas within the inflatable chamber 112, and may subsequently reduce forces exerted on a vehicle occupant as the occupant impacts the airbag cushion 110 and improve occupant ride down.

Figure 3A:
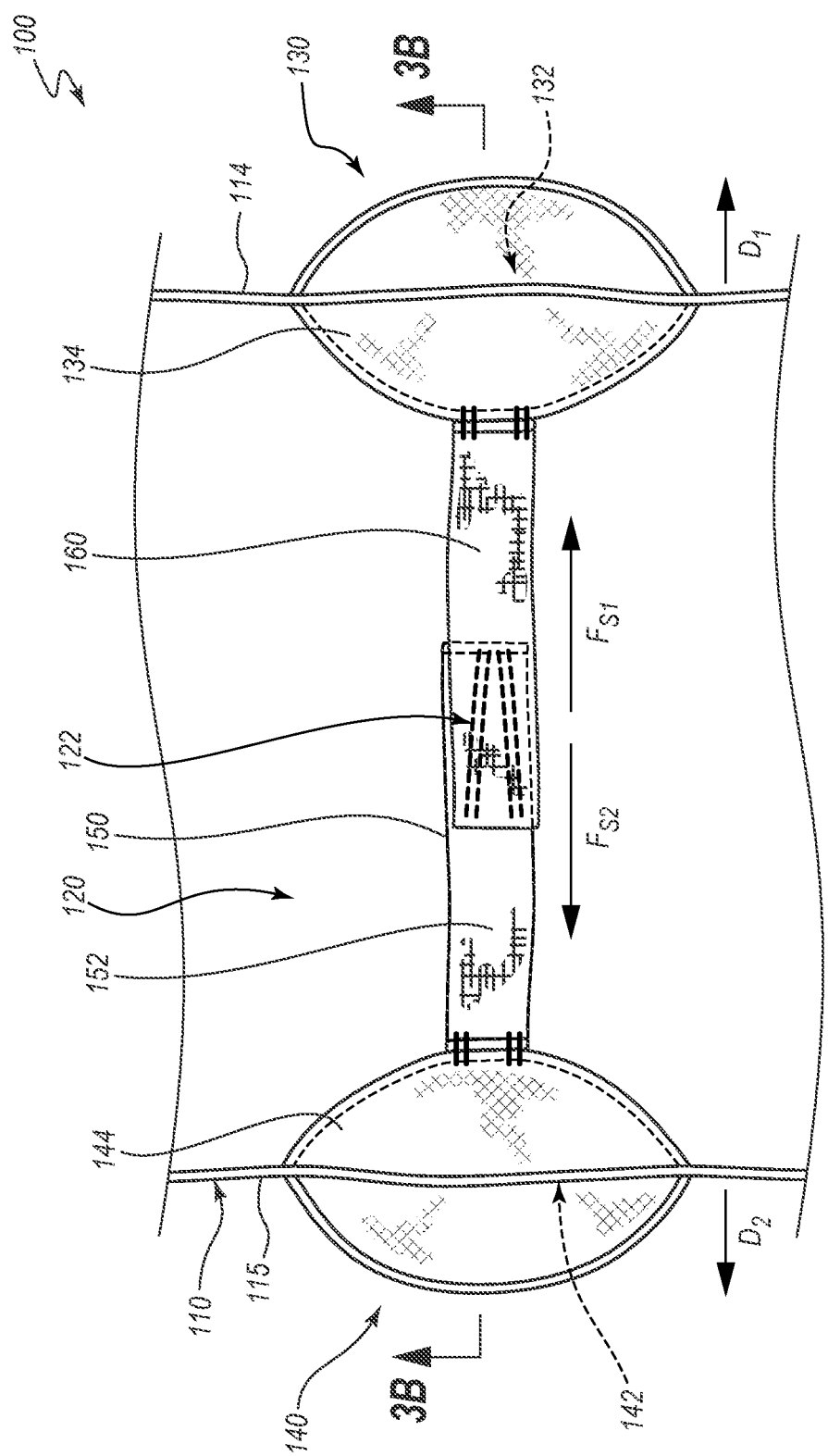
FIG. 3A is a top cross sectional view of the airbag assembly of FIG. 1A during deployment of the airbag.
Figure 3B:
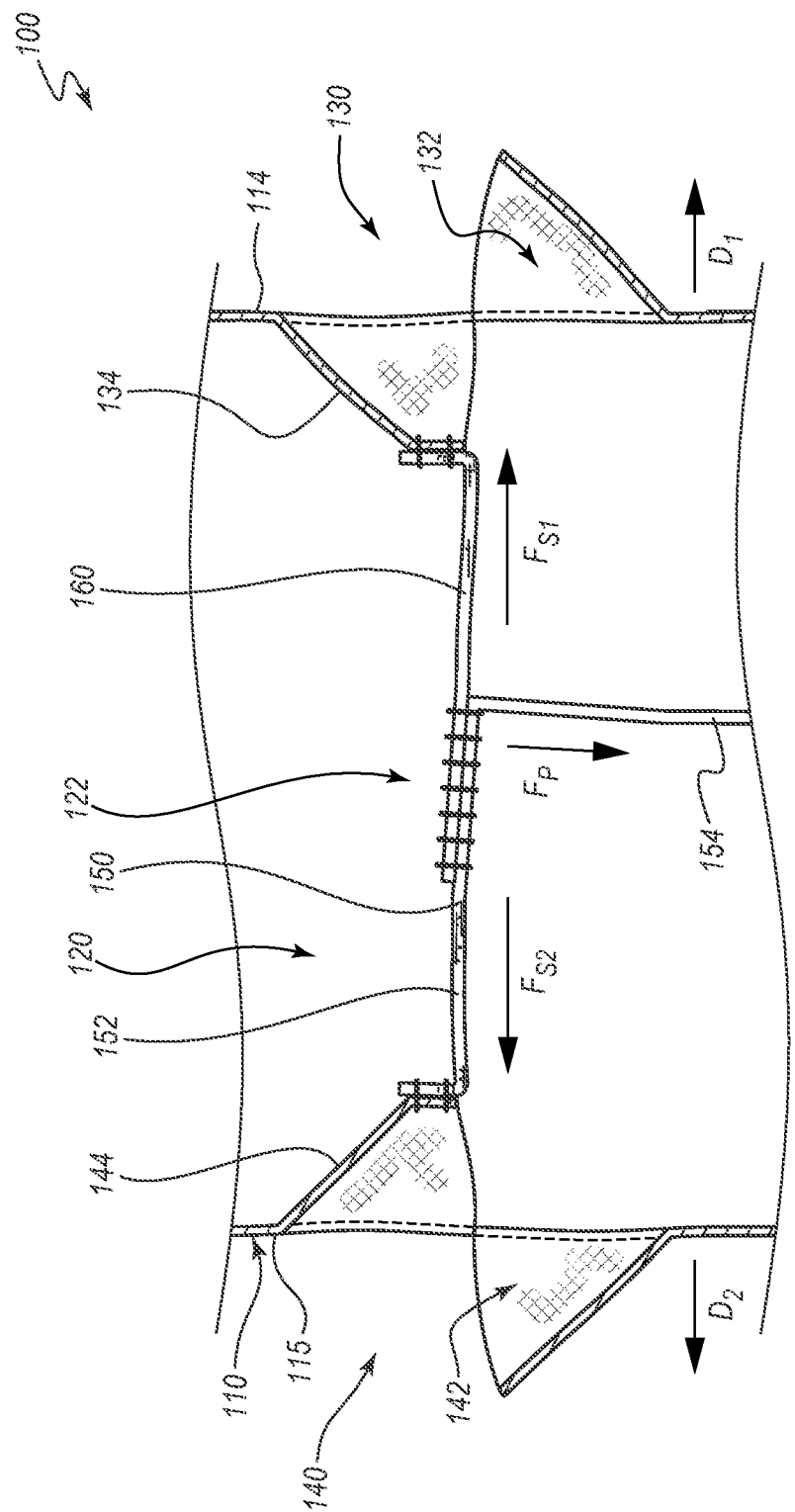
FIG. 3B is a side cross sectional view of the airbag assembly of FIG. 1A during deployment of the airbag.

FIGS. 3A and 3B are a cross sectional view of the airbag assembly 100 of FIG. 1A at a substantially similar stage of deployment as FIGS. 1B, 2A, and 2B. In FIGS. 3A and 3B, the venting assembly 120 is in the sheer state, the first portion 152 of the peel tether 150 and the sheer tether 160 drawn into a taut state, and the vents 130, 140 are in the first venting state. The sheer tether 160 is coupled to the first vent 130 at one end, and has drawn a first portion 134 (e.g., a first side of a slit forming the aperture 132) of the vent 130 toward the opposing panel 115 and away from the panel 114 through which the vent aperture 132 is defined. Similarly, the first portion 152 of the peel tether 150 is coupled to the second vent 140 at one end, and has drawn a first portion 144 (e.g., a first side of a slit forming the aperture 142) of the vent 140 toward the opposing panel 114 of the second vent 140. As described, the airbag cushion 110 may produce a sheer forces on the first portion 152 of the peel tether 150 and on the sheer tether 160 after initial inflation of the airbag cushion 110. The sheer forces may include a first force $Fs_1$ in a first direction $D_1$, and a second force $Fs_2$ in a second direction $D_2$, the first and second directions $D_1$, $D_2$ opposite each other. The first panel 114 may expand in the first direction $D_1$, which produces the first force $F_1$ that pulls the sheer tether 160, the first portion 152 of the peel tether 150, and the first portion 144 of the vent 140 in the first direction $D_1$, via the releasable coupling 122. Similarly, the second panel 115 may expand in the second direction $D_2$, which produces the second force $F_2$ and pulls the first portion 152 of the peel tether 150, the sheer tether 160, and the first portion 134 of the vent 130 in the second direction $D_2$, via the releasable coupling 122. The releasable coupling 122 comprises a plurality of stitches that are configured to withstand the sheer forces $Fs_1$ and $Fs_2$ without bursting.

The second portion 154 of the peel tether 150 in the taut state may produce a peel force, $F_p$, in a direction perpendicular or otherwise transverse to the sheer forces, $Fs_1$ and $Fs_2$. The peel force $F_p$ may cause the releasable coupling 122 to uncouple the sheer tether 160 from the peel tether 150. Specifically, the peel force on the second portion 154 of the peel tether can cause the peel tether to peel away the peel tether 150 from the sheer tether 160 to burst, uncouple, and/or, release the releasable coupling 122.

Figure 4:
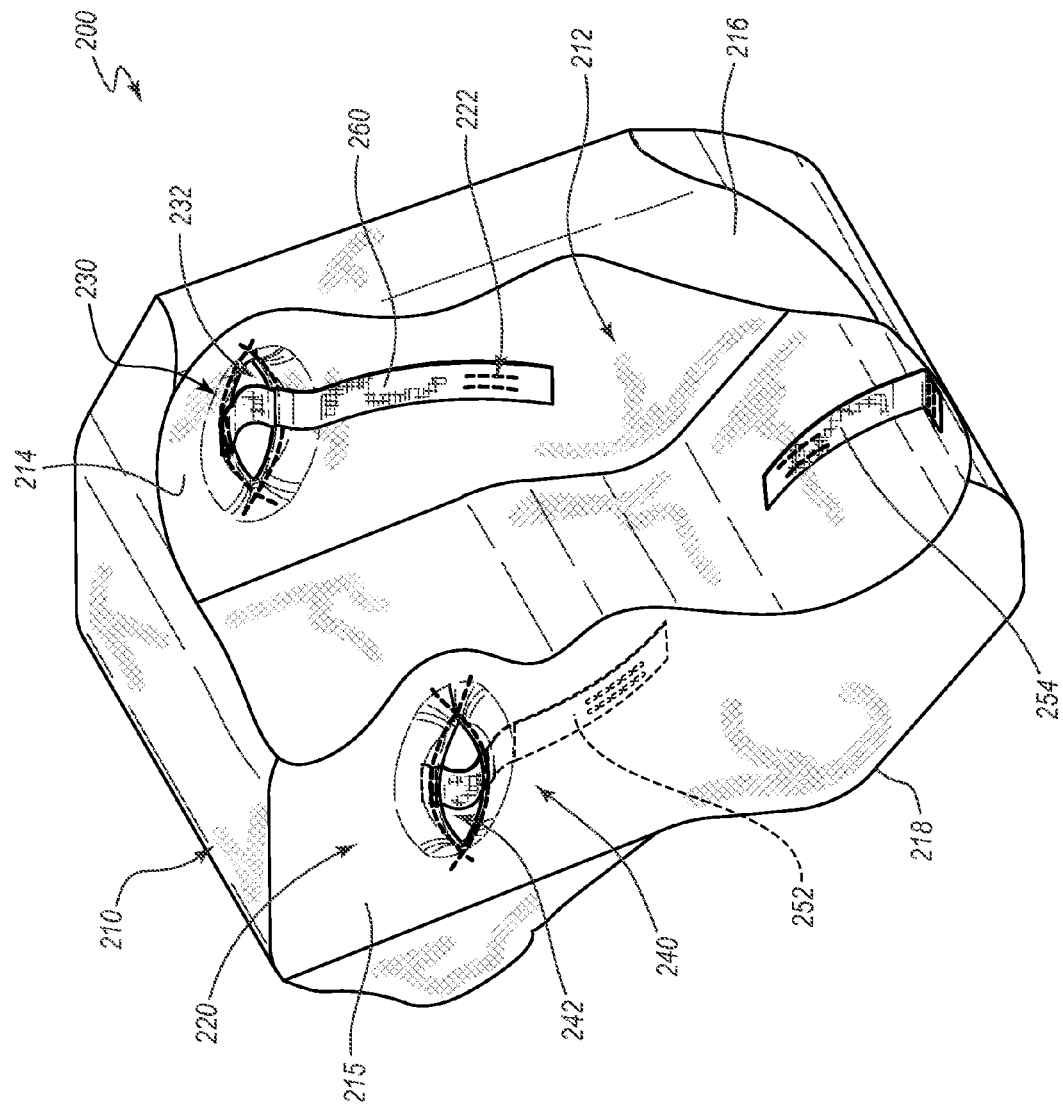
FIG. 4 is a cut-away perspective view showing the interior of another embodiment of an airbag system, with the airbag inflated and in a second venting state.

FIG. 4 is a perspective view of the interior of an airbag assembly 200, according to another embodiment of the present disclosure. More specifically, the airbag assembly 200 is deployed and is in a third state (e.g., a reduced venting state) with an inflated airbag cushion 210. The airbag assembly 200 of FIG. 4 is substantially similar to the airbag assembly 100 described previously and may be configured to receive a vehicle occupant with the rear surface 216. However, the airbag assembly 200 may include a plurality of tethers 252, 254 in place of the peel tether 150 of the airbag assembly 100. More specifically, the airbag assembly 200 may include the airbag cushion 210, a plurality of panels 214, 215, 218 configured to define an inflatable chamber 212, and a venting assembly 220 which may be configured in different states during deployment of the airbag assembly 200. The venting assembly 200 may include a first sheer tether 252, a second sheer tether 260, a peel tether 254, a releasable coupling 222, and two slits or slit-shaped vents 230, 240 (e.g., slit-shaped apertures) disposed in the panels 214, 215. The releasable coupling 222 may releasably couple the second sheer tether 260 to the first sheer tether 252. The releasable coupling 222 may also couple a first end of the peel tether 254 to the first and second sheer tethers 252, 260. The second sheer tether 260 may be further coupled to a first side of the slit 230. Additionally, the first sheer tether 252 may be coupled to a first side of the slit 240.

The peel tether 254 may be coupled at a second end to the panel 218 perpendicular to the panels 214, 215 of the slits 230, 240. The slits 230, 240 include a first side and a second side disposed opposite the first side. However, when the airbag assembly 200 is in a sheer state with the sheer tethers 252, 260 drawn taut, the first sides of the slits 230, 240 (e.g., a portion of the panels 214 and 215) are drawn inward and away from the second sides of the slits 230, 240 to increase the area of the slits 230, 240, thereby configuring the slits 230, 240 in a first state (e.g., a higher capacity venting state). Expansion of the airbag cushion 210 results in a peel force being created on the peel tether 254 that peels the peel tether 254 away from the sheer tethers 252, 260 and releases or uncouples the releasable coupling 222. Uncoupling of the sheer tethers 252 allows the slits 230, 240 to transition to a second state (e.g., a closed state) in which the first and second sides of the slits 230, 240 are disposed to at least partially obstruct the slits 230, 240.

When the pressurization of inflation gas within the inflatable chamber is sufficiently large the first and second sides of the slits 230, 240 may extend outward away from one another to increase the size of the slits 230, 240 and to allow inflation gas to exit the airbag assembly 200 via the slits 230, 240. In other words, when pressurization of inflation gas within the inflatable chamber exceeds a threshold, the slits 230, 240 may pucker and transition to a third state (e.g., a lower capacity venting state).

Figure 5:
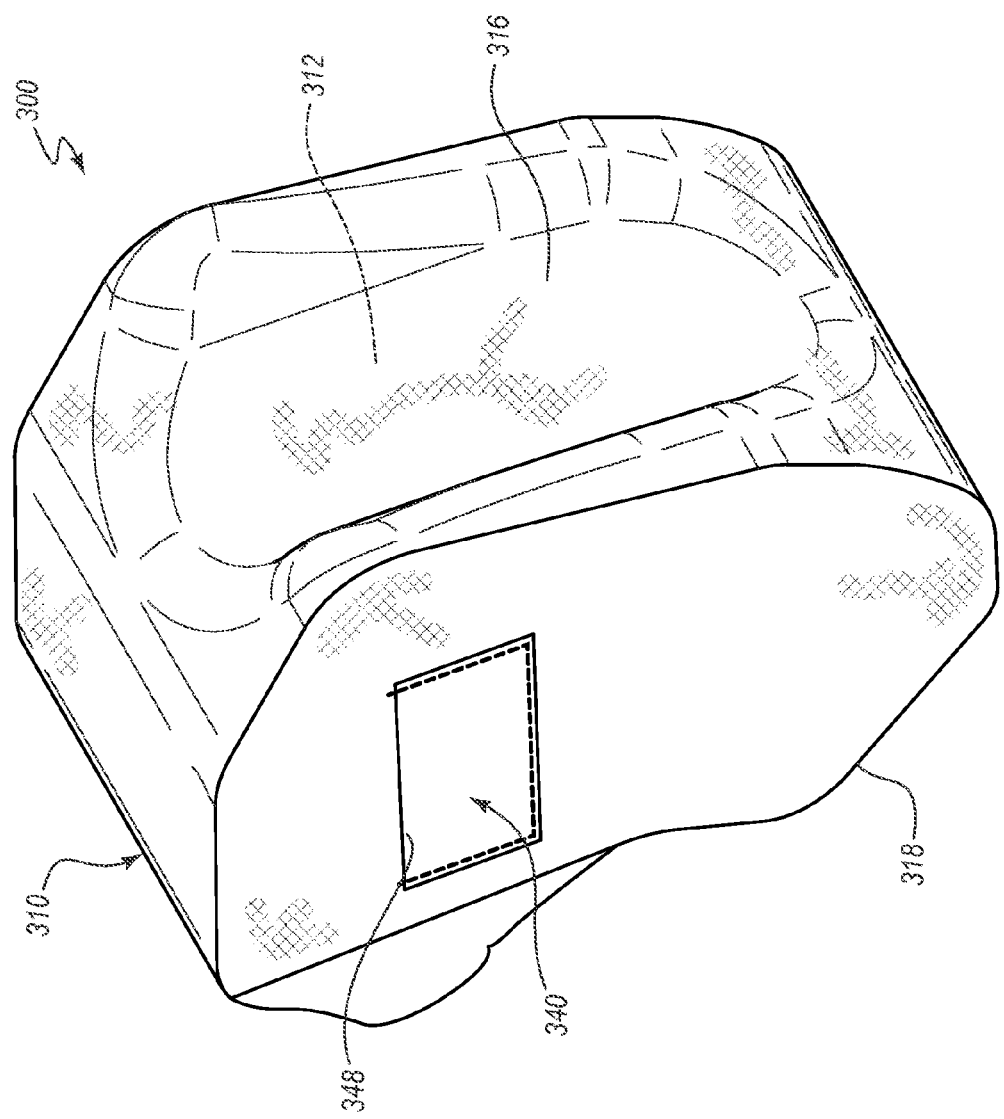
FIG. 5 is a perspective view of another embodiment of an airbag system, with the airbag inflated.

FIG. 5 is a perspective view of an airbag assembly 300, according to another embodiment of the present disclosure. The airbag assembly 300 includes an airbag cushion 310 in an inflated state, the airbag cushion 310 with a vent 340. The airbag assembly 300 may also include an aperture 370. The airbag cushion 310 may include a plurality of panels, 316, 318 configured to define an inflatable chamber 312. The vent 340 may include a vent patch 348 configured to control the flow of inflation gas from the airbag assembly 300 based on a pressurization of inflation gas within the inflatable chamber 312. For example, the vent patch 348 may be biased or otherwise configured to abut the panel 315, such as when the pressurization of inflation gas within the inflatable chamber 312 is below a pressurization threshold. In other words, the vent patch 348 may bias the vent 340 to a closed state.

A vent patch of the airbag assembly 300 (e.g., the vent patch 348) may be joined to an adjacent panel via stitching, one or more adhesives, taping, welding (e.g., radio frequency welding), heat sealing, one piece weaving, or any other suitable technique or combination of techniques for coupling a vent patch (e.g., the vent patch 348) to a panel of the airbag assembly 300.

Figure 6:
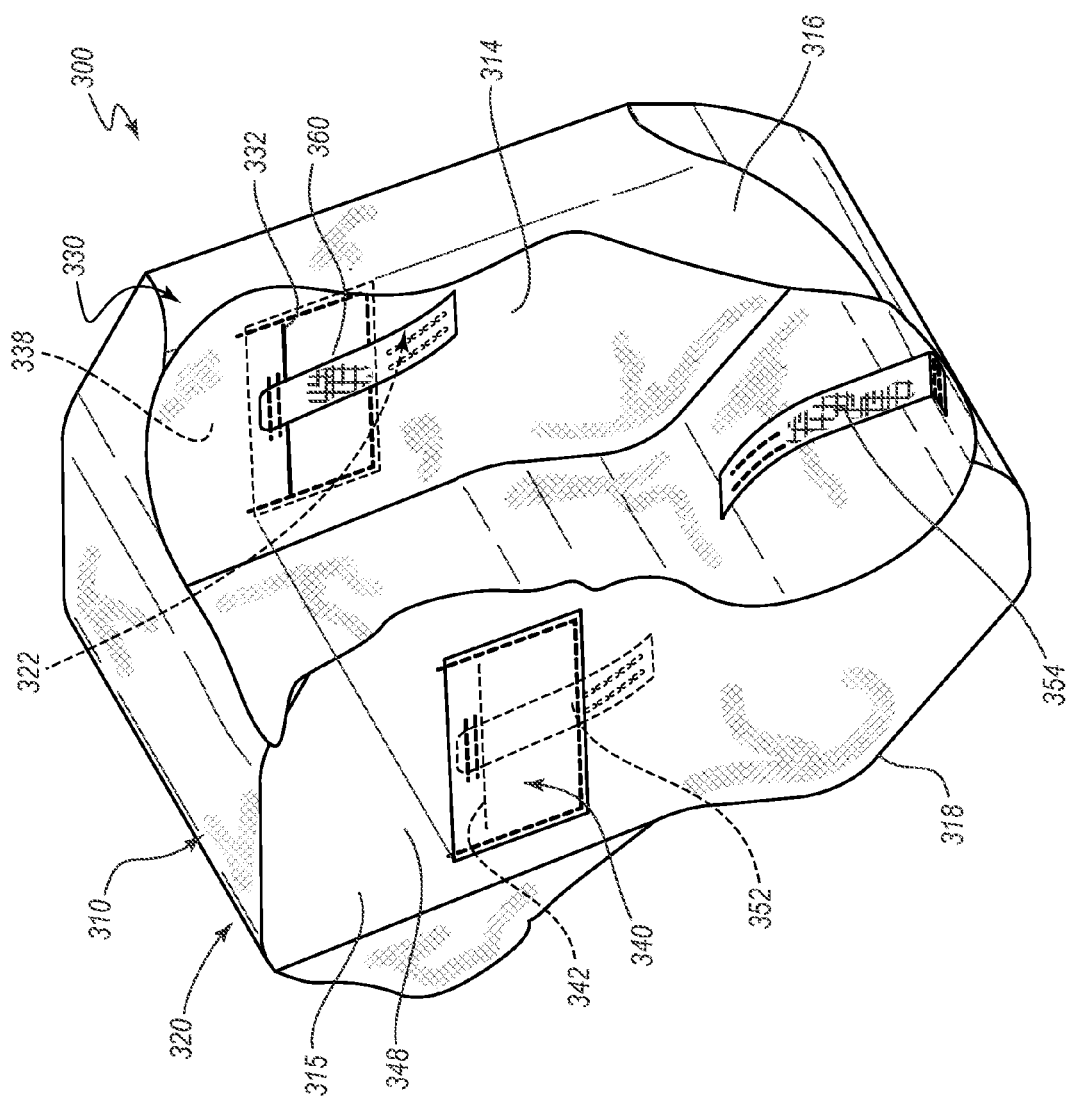
FIG. 6 is a cut-away perspective view showing the interior of the airbag system of FIG. 5.

FIG. 6 is a partial cut-away view of the airbag assembly 300 of FIG. 5, showing the interior of the airbag cushion 310 at a substantially similar stage of deployment as FIG. 5. The airbag cushion 310 is configured to receive an occupant on the surface 316 and to vent inflation gas through one or more apertures 332, 342, 370 to provide a soft or otherwise appropriate ride down. The airbag assembly 300 may include a venting assembly 320 comprising a sheer tether 360, a first peel tether 352, a second peel tether 354, and a releasable coupling 322 that releasably couples the tethers 352, 354, 360. More specifically, the releasable coupling 322 may couple the second sheer tether 360 to the first sheer tether 352. The second sheer tether 360 may be further coupled to a vent 330 with an aperture 332 through a panel 314. Additionally, the first sheer tether 352 may be coupled to another vent 340. The releasable coupling 322 may also couple a first end of the peel tether 354 to the first and second sheer tethers 352, 360.

The peel tether 354 may be coupled at a second end to the panel 318 perpendicular to the panels 314, 315 of the vents 330, 340. The vents 330, 340 include vent patches 338, 348 configured to abut the panel through which the vent 330, 340 is defined when the pressurization of inflation gas within the inflatable chamber 312 is below a predetermined threshold. However, when the airbag assembly 300 is in a sheer state with the sheer tethers 352, 360 drawn taut, a portion of the panels 314 and 315 is drawn inward and away from the vent patches 338, 348, thereby configuring the vents 330, 340 in a first state (e.g., a higher capacity venting state). Expansion of the airbag cushion 310 results in a peel force being created on the peel tether 354 that peels the peel tether 354 away from the sheer tethers 352, 360 and releases or uncouples the releasable coupling 322. Uncoupling of the sheer tethers 352 allows the vents 330, 340 to transition to a second state (e.g., a closed state) in which the biased vent patches 338, 348 at least partially obstruct the apertures 332, 342 of the vents 330, 340.

When the pressurization of inflation gas within the inflatable chamber is sufficiently large the vent patches 338, 348 may extend outward away from the panels 314, 315 to allow inflation gas to exit the airbag assembly 300 via vent apertures 332, 342. In other words, when pressurization of inflation gas within the inflatable chamber 312 exceeds a threshold, the vents 330, 340 transition to a third state (e.g., a lower capacity venting state).

Figure 7C:
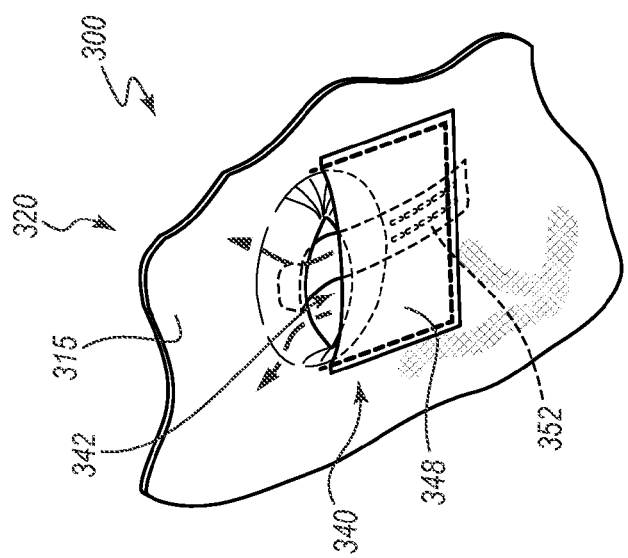
FIG. 7C is a close up view of a vent of the airbag system of FIG. 5, the vent in a second venting state.
Figure 7B:
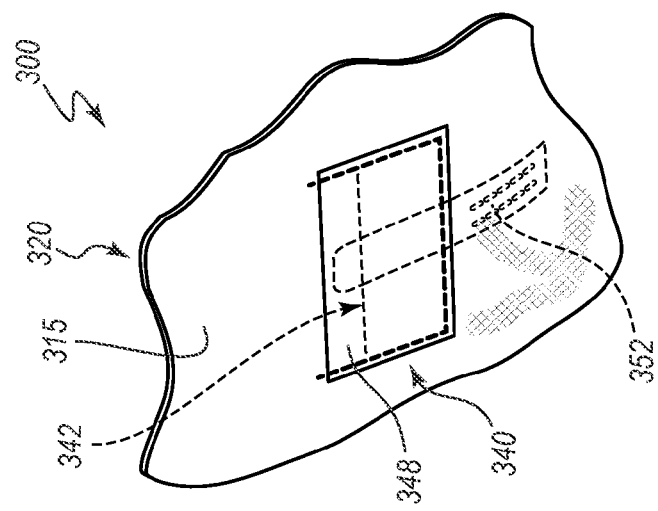
FIG. 7B is a close up view of a vent of the airbag system of FIG. 5, the vent in a closed state.
Figure 7A:
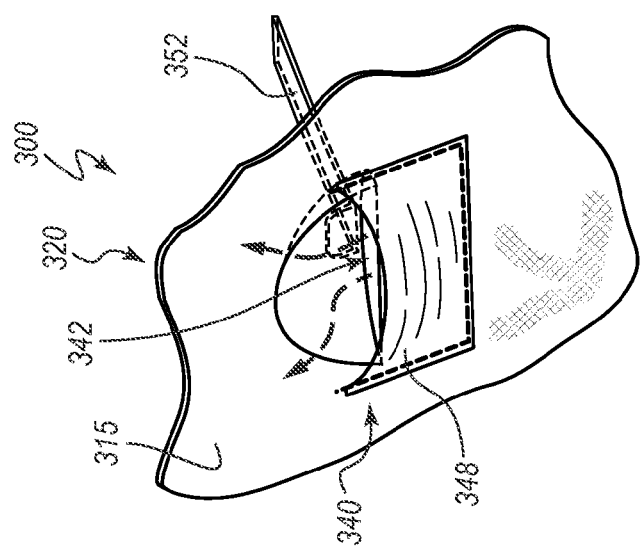
FIG. 7A is a close up view of a vent of the airbag system of FIG. 5, with a vent in a first venting state.

FIGS. 7A-7C are enlarged views of the venting assembly 320 of the airbag assembly 300 of FIG. 5, at various stages of deployment of the airbag assembly 300. FIG. 7A is an enlarged view of the vent 340 of the airbag assembly 300 in a first venting state, the venting assembly 320 in a sheer state, and the panel 315 drawn away from the vent patch 348 to configure the vent 340 in a first state. FIG. 7B is an enlarged view of the vent 340 in a closed state, a vent aperture 342 through a panel 315 closed, with a first peel tether 352 released. FIG. 7C is an enlarged view of the vent 340 in a second venting state, the vent aperture 342 puckered or expanded above or otherwise beyond a perimeter of the patch 348 to allow inflation gas to vent from the vent aperture 342.

Referring to FIGS. 7A-7C generally and collectively, the venting assembly 320 may be configured to vent different amounts of inflation gas from the airbag assembly 300 during various stages of inflation of the airbag assembly 300. For example, during initial inflation of the airbag assembly 300, as seen in FIG. 7A, the panel 315 may be drawn away from the vent patch 348 to vent inflation gas from the airbag assembly 300 via the aperture 342. Later, further inflation of the airbag assembly 300 may cause the first peel tether 352 to release the sheer tether, as seen in FIG. 7B. Inflation gas may become restricted from flowing through the vent aperture 342 by the vent patch 348. At any point during or following deployment a vehicle occupant may strike the airbag assembly 300, and may cause the pressurization of inflation gas to increase within the airbag 300. As a result, the pressure may exert an outward force on the vent 340 and may cause the vent aperture 342 to extend outward or pucker increasing the size of the vent aperture 342, until a portion of the aperture 342 is no longer occluded by the vent patch 348. With the size of the vent aperture 342 increased inflation gas may flow through the vent. The venting assembly 320 of FIG. 7B may be referred to as being in a second venting state, or a closed venting state.

Figure 8:
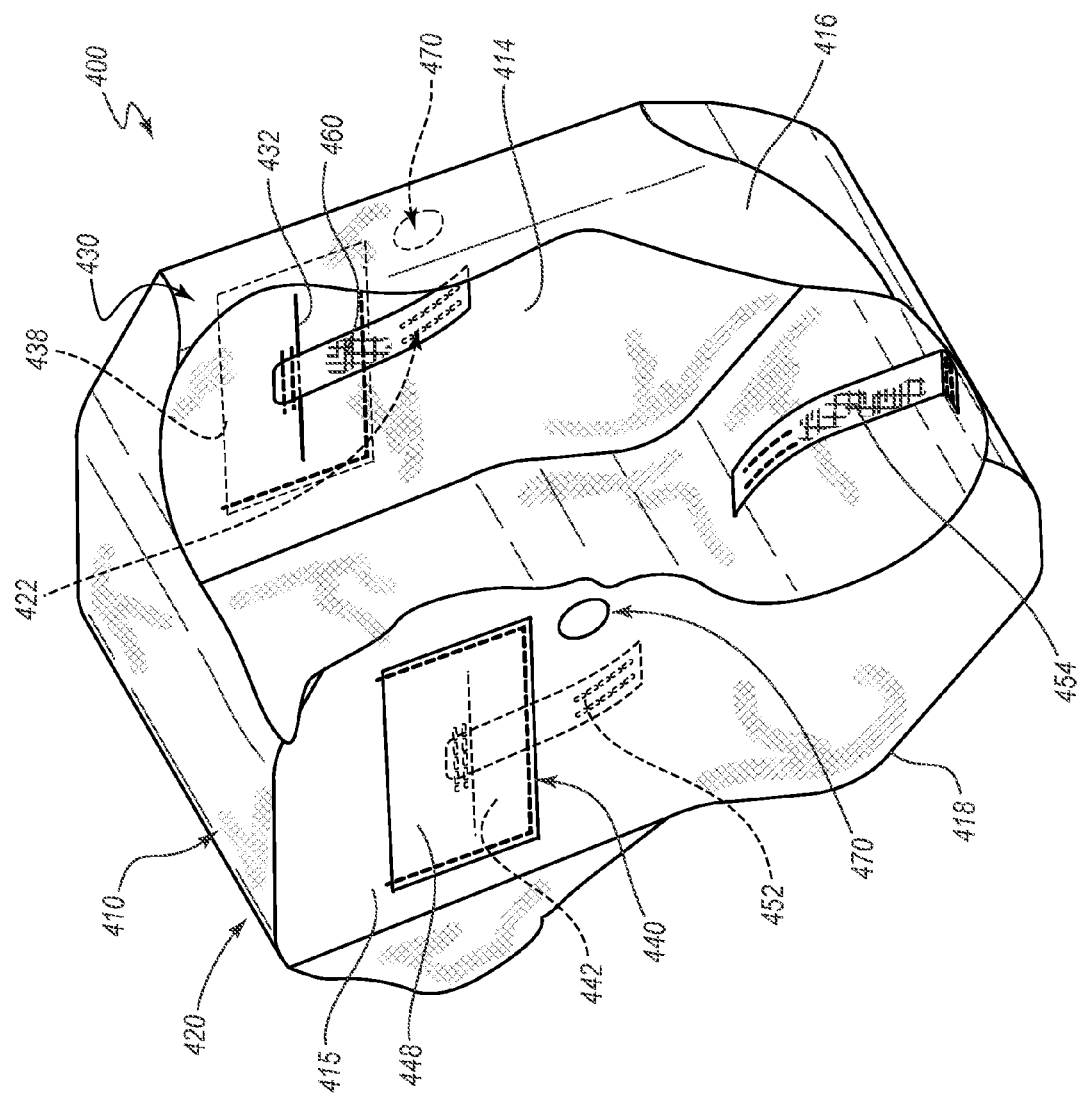
FIG. 8 is a cut-away perspective view showing the interior of another embodiment of an airbag system, with the airbag inflated.

FIG. 8 is a partially cut away perspective view of an interior of an airbag assembly 400, according to another embodiment of the present disclosure. The airbag assembly 400, may include an airbag cushion 410 with a plurality of discrete vents or apertures 470. The airbag cushion 410 may also include vents 430, 440 (e.g., slit vents). The airbag cushion 410 may include a plurality of panels 415, 416, 418. The discrete apertures 470 may vent inflation gas from the an airbag cushion 410 during deployment of the airbag cushion 410 and during loading of the airbag cushion 410 (e.g., as an occupant strikes or impacts the airbag cushion 410). The vents 430, 440 may include vent patches 438, 448 configured to control the flow of inflation gas from the airbag assembly 400 based on a configuration of the venting assembly 420 and a pressurization of inflation gas within the inflatable chamber 412. For example, the vent patch 448 may be biased or otherwise configured to abut the panel 415 and occlude a vent aperture, such as when the pressurization of inflation gas within the airbag assembly 400 is below a pressurization threshold. In other words, the vent patch 448 may bias the vent 440 to a closed state.

Figure 9B:
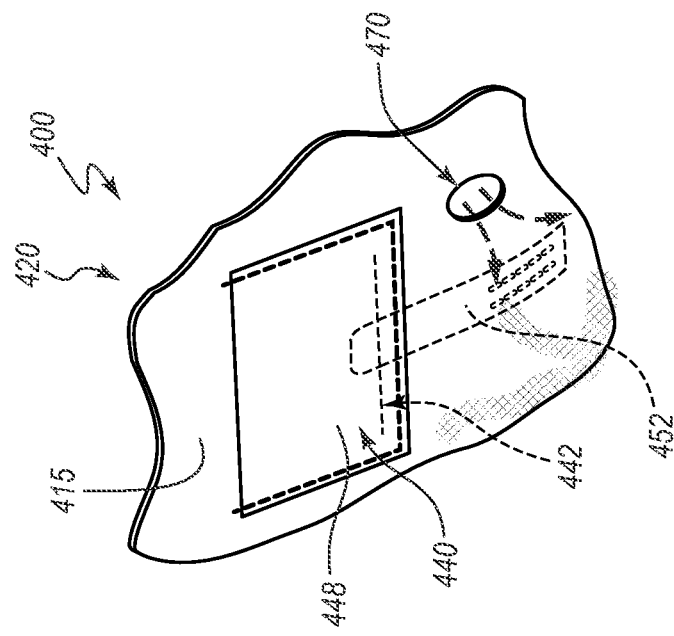
FIG. 9B is a close up view of a vent of the airbag system of FIG. 8, the vent in a closed state.
Figure 9A:
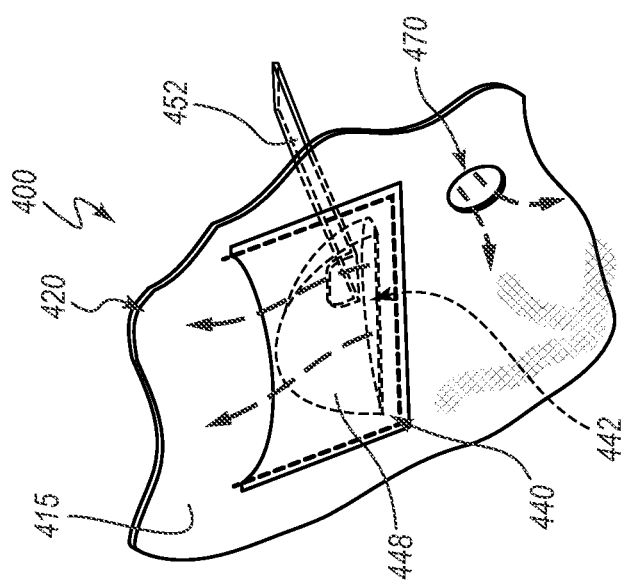
FIG. 9A is a close up view of a vent of the airbag system of FIG. 8, with a vent in a first venting state.

FIG. 9A is a close up view of the vent 440 of the airbag assembly 400 of FIG. 8, with the vent 440 in a first venting state. FIG. 9B is a close up view of the vent 440 of the airbag assembly 400 of FIG. 8 with the vent 440 in a closed state. Referring to FIGS. 9A and 9B generally and collectively, the venting assembly 420 may be configured to vent different amounts of inflation gas from the airbag assembly 400 during various stages of inflation of the airbag assembly 400. For example, during initial inflation of the airbag assembly 400, as seen in FIG. 9A, the discrete vent 470 may vent inflation gas from the airbag assembly 900. Simultaneously, the first sheer tether 452 may draw the panel 415 away from the vent patch 448 and may allow inflation gas to vent from the airbag assembly 400 via the vent aperture 442. Later, further inflation of the airbag assembly 400 may cause the first sheer tether 452 to release the second sheer tether, as seen in FIG. 9B. Inflation gas may continue to flow from the discrete aperture 470 (e.g., during occupant loading and ride down) but may remain restricted from flowing through the vent aperture 442 by the vent patch 448 which may abut the panel 415. The venting assembly 420 of FIG. 9B may be referred to as being in a second venting state, or a low venting state, in which the airbag assembly 400 may include a venting capacity that is less than that of the airbag assembly 400 while the venting assembly 420 is in the first venting state, as shown in FIG. 9A.

Figure 10A:
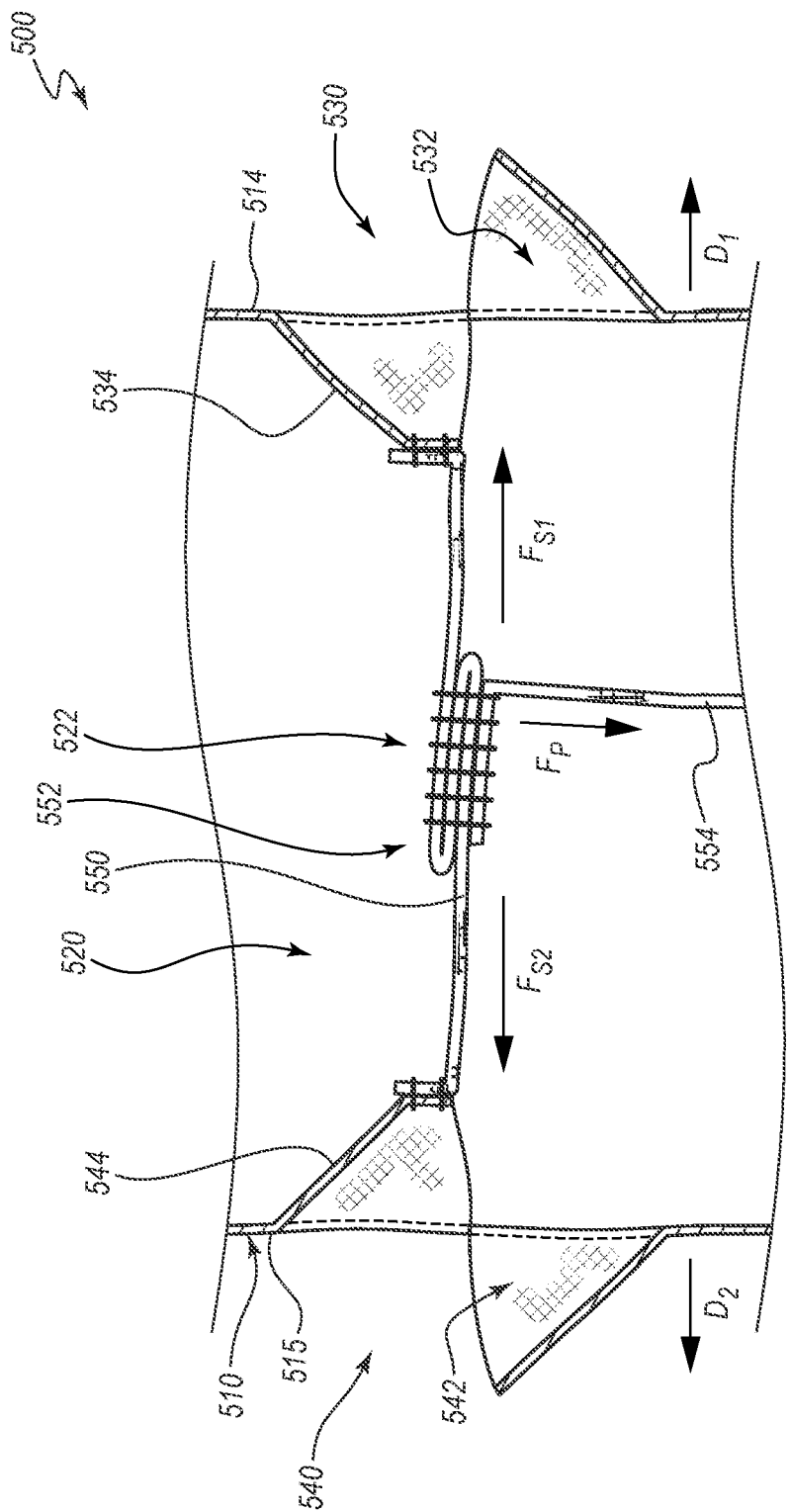
FIG. 10A is a side cross sectional view of another embodiment of an airbag system during deployment of the airbag.

FIG. 10A is a side cross sectional view of another embodiment of an airbag system during deployment of the airbag. In FIG. 10A, the venting assembly 520 is in the sheer state, the sheer tether 550 and the peel tether 554 drawn into a taut state, and the vents 530, 540 are in the first venting state. The sheer tether 550 is coupled to the first vent 530 at one end, and has drawn a first portion 534 (e.g., a first side of a slit forming the aperture 532) of the vent 530 toward the opposing panel 515 and away from the panel 514 through which the vent aperture 532 is defined. Similarly, the opposite end of the peel tether 550 is coupled to the second vent 540, and has drawn a first portion 544 (e.g., a first side of a slit forming the aperture 542) of the vent 540 toward the opposing panel 514. As described, the airbag cushion 510 may produce sheer forces on the peel tether 550 after initial inflation of the airbag cushion 510. The sheer forces may include a first force $Fs_1$ in a first direction $D_1$, and a second force $Fs_2$ in a second direction $D_2$, the first and second directions $D_1$, $D_2$ opposite each other. The first panel 514 may expand in the first direction $D_1$, which produces the first force $Fs_1$ that pulls the sheer tether 550, and the first portion 544 of the vent 540 in the first direction $D_1$, via the releasable coupling 522. Similarly, the second panel 515 may expand in the second direction $D_2$, which produces the second force $Fs_2$ and pulls the sheer tether 550, and the first portion 534 of the vent 530 in the second direction $D_2$, via the releasable coupling 522. The releasable coupling 522 comprises a plurality of stitches that are configured to withstand the sheer forces $Fs_1$ and $Fs_2$ without bursting to maintain a center portion 552 of the sheer tether 550 in a rolled and/or folded configuration. The releasable coupling may releasably couple the center portion 552 of the sheer tether 550 in a fold, which allows the sheer tether 550 to be drawn into a taut state.

The peel tether 554 in the taut state may produce a peel force $F_p$ in a direction perpendicular or otherwise transverse to the sheer forces, $Fs_1$ and $Fs_2$. The peel force $F_p$ may cause the releasable coupling 522 to uncouple the sheer tether 550 from the peel tether 554. Specifically, the peel force $F_p$ on the center portion 552 of the sheer tether 550 can cause the peel tether 554 to peel away from the sheer tether 550 to burst, uncouple, and/or, release the releasable coupling 522. After the releasable coupling 522 bursts, the center portion 552 of the sheer tether 550 may unfold or otherwise lengthen to allow the sheer tether 550 to transition from a taut state to a slack state.

Figure 10B:
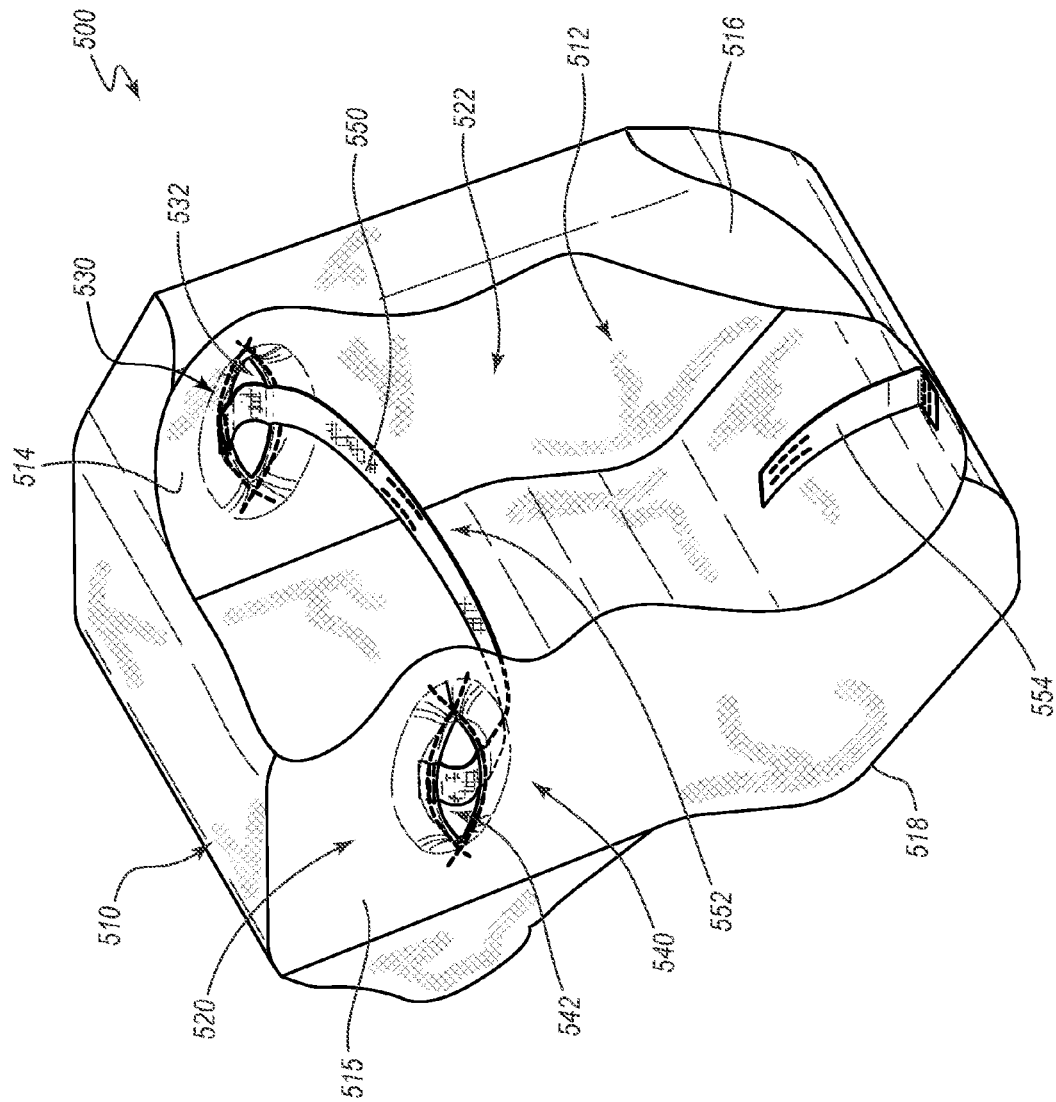
FIG. 10B is a cut-away perspective view showing the interior of the airbag system of FIG. 10A, with the airbag inflated and in a second venting state

FIG. 10B is a cut-away perspective view showing the interior of the airbag assembly 500 of FIG. 10A, with the airbag 510 inflated and in a second venting state. More specifically, the airbag assembly 500 is deployed and is in a third state (e.g., a reduced venting state) with an inflated airbag cushion 510. The airbag assembly 500 may include a plurality of tethers 550, 554. More specifically, the airbag assembly 500 may include the airbag cushion 510, a plurality of panels 514, 515, 518 configured to define an inflatable chamber 512, and a venting assembly 520 which may be configured in different states during deployment of the airbag assembly 500. The venting assembly 500 may include a sheer tether 550, a peel tether 554, a releasable coupling 522, and two slits or slit-shaped vents 530, 540 (e.g., slit-shaped apertures) disposed in the panels 514, 515.

The releasable coupling 522 may releasably couple the sheer tether 550 to the peel tether 554. The sheer tether 550 may be coupled to a first side of the slit 530. Additionally, the sheer tether 550 may be coupled to a first side of the slit 540.

The peel tether 554 may be coupled at a second end to the panel 518 perpendicular to the panels 514, 515 of the vents 530, 540. The vents 530, 540 include apertures or slits 532, 542 having a first side and a second side disposed opposite the first side. However, when the airbag assembly 500 is in a sheer state with the sheer tether 550 drawn taut, the first sides of the slits 532, 542 (e.g., a portion of the panels 514 and 515) are drawn inward and away from the second sides of the slits 532, 542 to increase the area of the slits 532, 542, thereby configuring the vents 530, 540 in a first state (e.g., a higher capacity venting state). Expansion of the airbag cushion 510 results in a peel force being created on the peel tether 554 that peels the peel tether 554 away from the sheer tether 550, and releases or uncouples the releasable coupling 522. Uncoupling of the tethers 550, 554 allows the vents 530, 540 to transition to a second state (e.g., a closed state) in which the first and second sides of the slits 532, 542 are disposed to at least partially obstruct the vents 530, 540.

When the pressurization of inflation gas within the inflatable chamber is sufficiently large the first and second sides of the slits 532, 542 may extend outward away from one another to increase the size of the slits 532, 542 and to allow inflation gas to exit the airbag assembly 500 via the vents 530, 540. In other words, when pressurization of inflation gas within the inflatable chamber exceeds a threshold, the vents 530, 540 may pucker and transition to a third state (e.g., a lower capacity venting state).

Reference throughout this specification to "an embodiment" or "the embodiment" means that a particular feature, structure, or characteristic described in connection with that embodiment is included in at least one embodiment. Such references, as recited throughout this specification, are not necessarily all referring to the same embodiment.

Similarly, it should be appreciated that in the above description of embodiments, various features are sometimes grouped together in a single embodiment, figure, or description for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows in the claims.

I claim:

1. An airbag assembly comprising:
   an airbag cushion comprising one or more panels that define an inflatable chamber into which inflation gas can be received to inflate the airbag cushion;

a first vent in a first panel of the one or more panels of the airbag cushion, the first vent comprising a first aperture defined through the first panel;

a sheer tether coupled to the first vent, the sheer tether to be drawn taut by expansion of the airbag cushion during inflation to configure the first vent in a first venting state;

a peel tether releasably coupled to the sheer tether, the peel tether to be drawn taut as the airbag cushion continues to expand after the sheer tether is drawn taut; and a releasable coupling to releasably couple the peel tether to the sheer tether, the releasable coupling configured to resist a sheer force transverse to the first panel to maintain the sheer tether drawn taut, the sheer force produced by expansion of the airbag drawing the sheer tether taut, the releasable coupling further configured to release in response to a peel force transverse to the sheer force, the peel force produced by expansion of the airbag drawing the peel tether taut, wherein the release of the releasable coupling causes the sheer tether to slacken and the first vent to transition from the first venting state to a second state, and wherein the first vent is configured to transition from the second state to a third state upon pressurization in the inflatable chamber exceeding a threshold, wherein the third state is a venting state with a lower venting capacity than a venting capacity of the first venting state.

2. The airbag assembly of claim 1, wherein the second state of the first vent is a closed state.

3. The airbag assembly of claim 1, wherein configuring the first vent in the first venting state increases a venting capacity of the airbag assembly.

4. The airbag assembly of claim 1, wherein the sheer tether is coupled at a first end to the first vent in the first panel and coupled at a second end to a second panel of the one or more panels, the second panel opposite the first panel.

5. The airbag assembly of claim 1, the first aperture of the first vent comprising a slit, wherein configuring the first vent in the first venting state comprises increasing a distance of a first side of the slit from a second side of the slit.

6. The airbag assembly of claim 5, wherein the first end of the sheer tether is attached to the first side of the slit and configuring the first vent in the first venting state comprises the sheer tether drawn taut also drawing the first side of the slit away from the second side of the slit.

7. The airbag assembly of claim 1, wherein the releasable coupling comprises one or more break stitches in both of the sheer tether and the peel tether, the one or more break stitches configured to burst when the peel force exceeds a release threshold.

8. The airbag assembly of claim 1, further comprising:
a second vent in a second panel of the one or more panels of the airbag cushion, the second panel disposed opposite the first panel, the second vent comprising a second aperture defined through the second panel,
wherein the sheer tether is coupled to the second vent and is to be drawn taut by expansion of the airbag cushion during inflation to configure the first vent and the second vent in a first venting state.

9. The airbag assembly of claim 8, wherein the sheer tether comprises:
a first portion coupled to the first vent; and
a second portion coupled to the second vent, such that the sheer tether drawn taut configures both the first vent and the second vent in the first venting state,
wherein the releasable coupling releasably couples the peel tether to the first portion of the sheer tether and to the second portion of the sheer tether and release of the releasable coupling causes the first portion of the sheer tether and the second portion of the sheer tether to transition to a slack state and the first vent and the second vent to transition from the first venting state to a second state.

10. The airbag assembly of claim 9, wherein the first portion of the sheer tether is distinct from the second portion of the sheer tether, such that the first portion separates from the second portion at the release of the releasable coupling.

11. The airbag assembly of claim 1, further comprising:
a second vent in a second panel of the one or more panels of the airbag cushion, the second panel disposed opposite the first panel, the second vent comprising a second aperture defined through the second panel;
wherein a first portion of the peel tether is coupled to the second vent;
wherein the first portion of the peel tether in the taut state draws the second vent into a first venting state, and
wherein the second vent is configured to transition from the first venting state to a second state in response to the peel tether uncoupling from the sheer tether.

12. The airbag assembly of claim 1, wherein the first vent further comprises a first vent flap coupled to the first vent,
wherein the first vent flap is configured to abut a portion of the first panel and cover the first aperture while the first vent is in the second state, and
wherein the first vent flap is configured to extend away from the first vent when a pressure within the inflatable chamber exceeds a predetermined pressure threshold and the releasable coupling is released.

13. The airbag assembly of claim 1, wherein if the occupant is in an out-of-position condition and impacts the airbag cushion, the peel tether is configured to remain slack and the sheer tether is configured to remain taut state throughout deployment of the airbag cushion, such that the first vent cannot transition from the first venting state to the second state while the occupant is in the out-of-position condition.

14. An airbag assembly comprising:
an airbag cushion comprising one or more panels that define an inflatable chamber into which inflation gas can be received to inflate the airbag cushion;
a first vent disposed in the airbag cushion, the first vent comprising a first aperture to vent inflation gas from the inflatable chamber;
a sheer tether coupled to the first vent, the sheer tether to be drawn to a taut state by expansion of the airbag cushion during inflation, which produces a sheer force on the sheer tether, the sheer tether in the taut state to configure the first vent in a first venting state; and
a peel tether releasably coupled to the sheer tether, the peel tether to be drawn from a slack state to a taut state by continued to expansion of the airbag cushion during inflation after the sheer tether is drawn to the taut state to produce a peel force on the peel tether, the peel force transverse to the sheer force, wherein the peel force releases the peel tether from the sheer tether, which causes the sheer tether to transition to a slack state and the first vent to transition from the first venting state to a second state,
wherein the first vent is configured to transition from the second state to a third state upon pressurization in the inflatable chamber exceeding a threshold, wherein the third state is a venting state with a lower venting capacity than a venting capacity of the first venting state.

15. The airbag assembly of claim 14, further comprising:
a second vent disposed in the airbag cushion at a position on an opposite side of the airbag cushion from the first vent, the second vent comprising a second aperture to vent inflation gas from the inflatable chamber,
wherein the sheer tether is coupled to the second vent, the sheer tether to be drawn taut by expansion of the airbag cushion during inflation to configure the second vent in a first venting state.

16. The airbag assembly of claim 15, wherein the sheer tether comprises:
a first portion coupled to the first vent; and
a second portion coupled to the second vent, such that the first portion and the second portion of the sheer tether drawn taut configures the second vent in the first venting state,
wherein the peel tether is releasably coupled to the first portion of the sheer tether and to the second portion of the sheer tether and the peel force releasing the peel tether from the sheer tether includes release of the first portion of the sheer tether from the second portion of the sheer tether to transition the first and second portions of the sheer tether to a slack state and to transition the first vent and the second vent from the first venting state to a second state.

17. The airbag assembly of claim 14, wherein the sheer tether comprises:
a first portion coupled to the first vent; and
a second portion coupled to the airbag cushion on an opposite side of the inflatable chamber from the first vent, such that the first portion and the second portion of the sheer tether drawn taut configures the first vent in the first venting state,
wherein the peel tether is releasably coupled to the first portion of the sheer tether and to the second portion of the sheer tether and the peel force releasing the peel tether from the sheer tether includes release of the first portion of the sheer tether from the second portion of the sheer tether, such that the first portion separates from the second portion at the release of the releasable coupling.

18. The airbag assembly of claim 14, wherein the sheer tether is coupled at a first end to the first vent at a first side of the airbag cushion and at a second end to a second side of the airbag cushion, the second side of the airbag cushion on an opposite side of the inflatable chamber from the first side of the airbag cushion,
wherein the sheer tether includes a first portion, a second portion, and a fold disposed between the first portion and the second portion when the sheer tether is drawn to the taut state with the peel tether releasably coupled to the sheer tether,
wherein the peel force releasing the peel tether from the sheer tether further releases the fold to unfold, which allows the sheer tether to lengthen and to transition to the slack state in which the first vent transitions from the first venting state to the second state.

19. The airbag assembly of claim 18, wherein the sheer tether is coupled at the second end to a second vent disposed in the second side of the airbag cushion.

20. An airbag assembly comprising:
an airbag cushion comprising one or more panels that define an inflatable chamber into which inflation gas can be received to inflate the airbag cushion;
a first vent in a first panel of the one or more panels of the airbag cushion, the first vent comprising a first aperture defined through the first panel;
a sheer tether coupled to the first vent, the sheer tether to be drawn taut by expansion of the airbag cushion during inflation to configure the first vent in a first venting state;
a peel tether releasably coupled to the sheer tether, the peel tether to be drawn taut as the airbag cushion continues to expand after the sheer tether is drawn taut; and
a releasable coupling to releasably couple the peel tether to the sheer tether, the releasable coupling configured to resist a sheer force transverse to the first panel to maintain the sheer tether drawn taut, the sheer force produced by expansion of the airbag drawing the sheer tether taut, the releasable coupling further configured to release in response to a peel force transverse to the sheer force, the peel force produced by expansion of the airbag drawing the peel tether taut,
wherein the release of the releasable coupling causes the sheer tether to slacken and the first vent to transition from the first venting state to a second state,
wherein the first vent further comprises a first vent flap coupled to the first vent,
wherein the first vent flap is configured to abut a portion of the first panel and cover the first aperture while the first vent is in the second state, and
wherein the first vent flap is configured to extend away from the first vent when a pressure within the inflatable chamber exceeds a predetermined pressure threshold and the releasable coupling is released.

21. An airbag assembly comprising:
an airbag cushion comprising one or more panels that define an inflatable chamber into which inflation gas can be received to inflate the airbag cushion;
a first vent disposed in the airbag cushion, the first vent comprising a first aperture to vent inflation gas from the inflatable chamber;
a sheer tether coupled to the first vent, the sheer tether to be drawn to a taut state by expansion of the airbag cushion during inflation, which produces a sheer force on the sheer tether, the sheer tether in the taut state to configure the first vent in a first venting state; and
a peel tether releasably coupled to the sheer tether, the peel tether to be drawn from a slack state to a taut state by continued to expansion of the airbag cushion during inflation after the sheer tether is drawn to the taut state to produce a peel force on the peel tether, the peel force transverse to the sheer force, wherein the peel force releases the peel tether from the sheer tether, which causes the sheer tether to transition to a slack state and the first vent to transition from the first venting state to a second state,
wherein the first vent further comprises a first vent flap coupled to the first vent,
wherein the first vent flap is configured to abut a portion of the one or more panels and cover the first aperture while the first vent is in the second state, and
wherein the first vent flap is configured to extend away from the first vent when a pressure within the inflatable chamber exceeds a predetermined pressure threshold and the releasable coupling is released.

* * * * *